US008737286B2

(12) United States Patent
Golitschek Edler Von Elbwart et al.

(10) Patent No.: US 8,737,286 B2
(45) Date of Patent: May 27, 2014

(54) SUB-FRAME STRUCTURE FOR USE IN ADVANCED COMMUNICATION SYSTEMS

(75) Inventors: Alexander Golitschek Edler Von Elbwart, Darmstadt (DE); Christian Wengerter, Kleinheubach (DE)

(73) Assignee: Panasonic Corporation, Osaka (JP)

( * ) Notice: Subject to any disclaimer, the term of this patent is extended or adjusted under 35 U.S.C. 154(b) by 168 days.

(21) Appl. No.: 13/265,257

(22) PCT Filed: Apr. 23, 2010

(86) PCT No.: PCT/EP2010/002518
§ 371 (c)(1),
(2), (4) Date: Nov. 16, 2011

(87) PCT Pub. No.: WO2010/121826
PCT Pub. Date: Oct. 28, 2010

(65) Prior Publication Data
US 2012/0093065 A1 Apr. 19, 2012

(30) Foreign Application Priority Data
Apr. 23, 2009 (EP) .................................... 09005715

(51) Int. Cl.
*H04B 7/14* (2006.01)
(52) U.S. Cl.
USPC ......................................................... 370/315
(58) Field of Classification Search
USPC ......................................................... 370/315
See application file for complete search history.

(56) References Cited

U.S. PATENT DOCUMENTS

| RE41,497 E * | 8/2010 | Sugaya ......................... 714/746 |
| 2008/0107073 A1 | 5/2008 | Hart |
| 2010/0202322 A1 | 8/2010 | Cai |
| 2011/0038294 A1 | 2/2011 | Zhou |
| 2012/0063384 A1 * | 3/2012 | Bi et al. ........................ 370/315 |

FOREIGN PATENT DOCUMENTS

| CN | 101179326 | 5/2008 |
| EP | 1 919 100 | 5/2008 |
| JP | 2001-103560 | 4/2001 |
| JP | 2009-533943 | 9/2009 |
| JP | 2010-502072 | 1/2010 |
| JP | 2010-524367 | 7/2010 |

OTHER PUBLICATIONS

International Search Report dated Aug. 31, 2010.
(Continued)

*Primary Examiner* — Sai-Ming Chan
(74) *Attorney, Agent, or Firm* — Dickinson Wright PLLC

(57) ABSTRACT

The invention relates to the definition of a structure of a sub-frame for transmission from a Node B to at least one relay node in a communication system. Furthermore, the invention is also related to the operation of Node B and relay node regarding the generation, transmission and reception of such special sub-frame format. The invention is inter alia applicable to a 3GPP LTE-A system as standardized by the 3rd Generation Partnership Project (3GPP). The invention suggests a new structure for a sub-frame that is capable of conveying control information and/or data for a relay node to the relay node essentially independent from propagation delays. The structure of the sub-frame takes into account propagation delays of the radio signal from Node B to relay node, in that control information and/or data for a relay node is transmitted from the Node B on OFDM symbols that can be expected to be received by the relay node.

8 Claims, 21 Drawing Sheets

(56) References Cited

OTHER PUBLICATIONS

V. Gene, et al., "IEEE 802.16J Relay-Based Wireless Access Networks: An Overview," Recent Advances and Evolution of WLAN and WMAN Standards, IEEE Wireless Communications, vol. 15, No. 5, XP011236529, Oct. 2008, pp. 56-63.

K. H. Teo, et al., "Adaptive Frame Structure for Mobile Multihop Relay (MMR) Networks," 6th International Conference on Communications & Signal Processing, XP031229602, Dec. 10, 2007, pp. 1-5.

A. Saed, "Mobile Multi Hop Relay IEEE 802.16j," IEEE Mini-Symposium on Multipoint Communication Systems, XP002552339, Apr. 3, 2009, pp. 1-12.

3GPP TR 25.913 V8.0.0, "3rd Generation Partnership Project; Technical Specification Group Radio Access Network; Requirements for Evolved Utra (E-UTRA) and Evolved Utran (E-UTRAN) (Release 8)," Dec. 2008, pp. 1-18.

3GPP TS 36.211 V8.6.0, "3rd Generation Partnership Project; Technical Specification Group Radio Access Network; Evolved Universal Terrestrial Radio Access (E-UTRA); Physical Channels and Modulation (Release 8)," Mar. 2009, pp. 1-83.

Japanese Notice of Reasons for Rejection dated Nov. 19, 2013 with English translation.

Chinese Office Action dated Nov. 22, 2013 with English Translation.

\* cited by examiner

SUB-FRAME STRUCTURE FOR USE IN ADVANCED COMMUNICATION SYSTEMS

FIELD OF THE INVENTION

The invention relates to the definition of a structure of a sub-frame for transmission from a Node B to at least one relay node in a communication system. Furthermore, the invention is also related to the operation of Node B and relay node regarding the generation, transmission and reception of such special sub-frame format. The invention is inter alia applicable to a 3GPP LTE-A system as standardized by the $3^{rd}$ Generation Partnership Project (3GPP).

TECHNICAL BACKGROUND

3GPP Long Term Evolution (3GPP LTE)

Third-generation mobile systems (3G) based on WCDMA radio-access technology, such as UMTS (Universal Mobile Communications System), are currently deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE. The work item (WI) specification on LTE called Evolved UMTS Terrestrial Radio Access (UTRA) and UMTS Terrestrial Radio Access Network (UTRAN) is to be finalized as Release 8 (LTE Rel. 8). The LTE system represents efficient packet-based radio access and radio access networks that provide full IP-based functionalities with low latency and low cost. The detailed system requirements are given in 3GPP TR 25.913, "Requirements for Evolved UTRA (E-UTRA) and Evolved UTRAN (E-UTRAN)," version 8.0.0, January 2009 (available at http://www.3gpp.org and incorporated herein by reference).

In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmission power of the user equipment (user equipment). Many key packet radio access techniques are employed including multiple-input multiple-output (MIMO) channel transmission techniques, and a highly efficient control signaling structure is achieved in LTE Rel. 8.

Packet-Scheduling and Shared Channel Transmission

In modern wireless communication systems employing packet-scheduling, at least part of the air-interface resources are assigned dynamically to different receivers. In a communication system, typically the packet-scheduling is done by a network node (typically the Node B or base station), and the receivers are usually terminals or user equipments (UE). In advanced communication systems, it is also possible to employ so-called "Relay Nodes" (RN) or "relays" that act as an intermediate transceiving node between the Node B and the user equipment. Since the relay node is connected to the Node B in the same way as a user equipment, the Node B has to allocate resources to the user equipments as well as to the relay nodes within its reach.

From the perspective of making the resource allocation known within the communication system, the Node B (sometimes also called eNB or eNode B) can be seen as a transmitter, while relay node and user equipment act as receivers. Depending on whether the resource allocation actually assigns transmissions or receptions, any of the Node B, relay node, or user equipment can act as either a transmitter or receiver, as will be appreciated by those skilled in the art. In the following, the role of "transmitter" and "receiver" is assumed to be with respect to the described scenario for making the resource allocation known. In short, this is achieved by the Node B transmitting a control channel, that carries the resource allocation information, and which is received by relay node and user equipment.

The dynamically allocated resources are usually mapped onto at least one SDCH (Shared Data CHannel), where a SDCH corresponds to e.g. the following configurations:

One or multiple codes in a CDM(A) (Code Division Multiple Access) system are dynamically shared between multiple MS.

One or multiple subcarriers (subbands) in an OFDM(A) system are dynamically shared between multiple MS.

Combinations of the above in an OFCDM(A) (Orthogonal Frequency Code Division Multiplex Access) or a MC-CDM(A) (Multi Carrier-Code Division Multiple Access) system are dynamically shared between multiple MS.

FIG. 1 shows a packet-scheduling system on a shared channel for systems with a single SDCH. A sub-frame reflects the smallest interval at which the scheduler (PHY/MAC Scheduler) performs the DRA (Dynamic Resource Allocation). Further, typically the smallest unit, which can be allocated, is defined by one sub-frame in time domain and by one code/subcarrier/subband in code/frequency domain. In the following, this unit is denoted as PRB (Physical Resource Block). Note that the DRA is performed in time domain and in code/frequency domain.

The main benefits of packet-scheduling are as follows:

Multireceiver diversity gain by TDS (Time Domain Scheduling): Assuming that the channel conditions of at least some receivers change over time due to fast (and slow) fading, at a given time instant the scheduler can assign available resources (codes in case of CDM, subcarriers/subbands in case of OFDM) to receivers having good channel conditions Dynamic receiver rate adaptation: Assuming that the required data rates by the receivers (services a receiver is running) changes dynamically over time, the scheduler can dynamically change the amount of allocated resources per receiver.

L1/L2 Control Signaling

In order to inform the receivers about their resource allocation, assigned transmission transport format and other data related information (e.g. HARQ), L1/L2 control signaling needs to be transmitted to the receivers. The control signaling needs to be multiplexed with data in a sub-frame (assuming that the allocation can change from sub-frame to sub-frame). Here, it should be noted, that the allocation might also be performed on a TTI (Transmission Time Interval) basis, where the TTI length is a multiple of the sub-frames. The TTI length may be fixed in a service area for all receivers, may be different for different receivers, or may even by dynamic for each receiver. Generally, then the L1/2 control signaling needs only be transmitted once per TTI, however, in some cases it may make sense to repeat the L1/2 control signaling within a TTI in order to increase the reliability. The following description focuses on a constant TTI length of one sub-frame, however, it is equally applicable to the various TTI configurations described above.

In 3GPP LTE Release 8, the L1/L2 control signaling is multiplexed with SDCH in a TDM fashion, such that the L1/L2 control signaling is transmitted in an early part of a sub-frame, while the SDCH is transmitted in the (remaining) late part of a sub-frame.

L1/L2 Control Channel Transmission in 3GPP LTE Release 8

The PDCCH carries one or more messages known as Downlink Control Information (DCI), where each DCI is equivalent to a L1/L2 Control Channel message. It should be noted that the terminology "downlink control information" relates only that control information is sent on the downlink. However, the message it contains can represent either a downlink or an uplink resource assignment/allocation and/or other content.

Each PDCCH is transmitted using one or more so-called Control Channel Elements (CCEs), where each CCE corresponds to nine sets of four physical resource elements known as Resource Element Groups (REGs). The CCEs are all transmitted within the Control Channel (CCH) Region as shown for example in FIG. 8.

The number of CCEs used for a particular PDCCH is determined according to the channel conditions. Generally each receiver has to check the whole control channel region to identify if any DCI is addressed (i.e. directed) towards it.

TD Relay

For the relay functionality, it is first assumed a layout as exemplary shown in FIG. 2. The Node B transmits L1/L2 control and data to a so-called macro-user equipment (UE1) and also to a relay (relay node), and the relay node transmits L1/L2 control and data to a so-called relay-user equipment (UE2).

Further assuming that the relay node operates in a time-duplexing mode, i.e. transmission and reception operation are not performed at the same time, we arrive at a non-exhaustive entity behavior over time as shown in FIG. 3. Whenever the relay node is in "transmit" mode, UE2 needs to receive the L1/L2 control channel and SDCH, while when the relay node is in "receive" mode, i.e. it is receiving L1/L2 control channel and SDCH from the Node B, it cannot transmit to UE2 and therefore UE2 cannot receive any information from the relay node in such a sub-frame.

The situation becomes somewhat trickier in case that the UE2 is not aware that it is attached to a relay node. As will be understood by those skilled in the art, in a communication system without relay node any user equipment can always assume that at least the L1/L2 control signal is present in every sub-frame.

In order to support such a user equipment in operation beneath a relay node, the relay node should therefore pretend such an expected behavior in all sub-frames. This leads to a behavior as shown in FIG. 4. The relay node has to transmit the L1/L2 control channel in each sub-frame (here assumed to be in the early part of each sub-frame), before it can switch to reception mode. Additionally shown is a "Gap" which is required to tune the relay node hardware and software from "transmit" to "receive" mode and vice versa, which is typically a fraction of a sub-frame. What can be seen is that effectively the time that is available for transmission from a Node B to a relay node is actually only a fraction of a sub-frame, as indicated in the figure by the dashed box. In 3GPP Release 8, the UE2 behavior shown for sub-frame 2, i.e. to receive only the first part identical to the L1/L2 control signaling, can be achieved by configuring that sub-frame as an "MBSFN sub-frame". Since this is done mainly to tell the UE2 to not process or expect the remainder of that sub-frame, it is also sometimes called a "fake MBSFN sub-frame". In LTE, a node transmitting such "fake MBSFN" sub-frames is required to transmit the first two OFDM symbols of such a sub-frame before it can switch to reception.

Propagation Delay Between Node B and Relay Node

As shown in FIG. 5, we can usually assume that more than a single relay node is deployed and connected to a Node B. In addition, it is possible that the relay node is not stationary, but can be mobile as a user equipment. For example, a relay node can be installed in a public transportation vehicle such as a bus, train, or tramway. In any case, the distance between Node B and at least one relay node is variable, so that different propagation delay for the signal from Node B to relay nodes will occur.

Using the exemplary deployment of FIG. 5, FIG. 6 illustrates the situation assuming that the relay nodes' transmission is synchronized to the Node B's transmission, as it is for example beneficial for the case that a user equipment should easily hand over between the Node B and a relay node or for simultaneous multipoint transmission purposes. For the first two OFDM symbols of the fake MBSFN sub-frame, Node B, RN1, and RN2 transmit simultaneously. Then for the relay nodes the first gap is required to switch to reception mode, followed by reception of the Node B transmission signal until just before the end of the sub-frame, where the second gap is required by the relay nodes to switch back again to transmission mode before the beginning of the next sub-frame.

As can be seen, depending on the length of the gaps and propagation delay for the signal between Node B and RN1 and between Node B and RN2; a relay node will be able to see only a limited and at least partially different set of OFDM symbols transmitted by the Node B. For RN1, the reception of OFDM symbol #1 overlaps with the gap, as does the reception of OFDM symbol #12. For RN2, the reception of OFDM symbol #2 overlaps with the gap, as does the reception of OFDM symbol #13. While RN1 can see OFDM symbols #2 to #11 completely, RN2 can see OFDM symbols #3 to #12 completely. Assuming a simple and cost-effective receiver at the relay node, partially invisible OFDM symbols cannot be used since they would contain a lot of interference and should therefore be considered as corrupt.

As seen from FIG. 4, the relay node is not able to detect the early part of a sub-frame transmitted by a Node B, which usually carries L1/L2 control information. Therefore a new method must be devised how to convey L1/L2 control signaling from Node B to relay node. In addition, different relay node nodes will be able to see different OFDM symbols from the Node B, such that provision should be taken that the L1/L2 control information is transmitted such that all relay nodes attached to a Node B are able to detect and receive that information.

SUMMARY OF THE INVENTION

One object of the invention is to suggest a new structure for a sub-frame that is capable of conveying control information and data for a relay node (relay control information or relay data) to the relay node essentially independent from propagation delays. Another object of the invention is to suggest a scheduling and sub-frame generation procedure for such sub-frame and the processing of received sub-frames in a relay node.

The object is solved by the subject matter of the independent claims. Advantageous embodiments of the invention are subject matters of the dependent claims.

According to one aspect, the structure of the sub-frame (i.e. its content within the individual OFDM symbols forming the sub-frame) is taking into account propagation delays of the radio signal from Node B to relay node, in that control information for a relay node (relay control information) is transmitted from the Node B on OFDM symbols that can be expected to be received by the relay node. As the Node B may be unaware of the propagation delay of the radio signal (which may be for example subject to change, e.g. if the relay node is moving) it ensures that all relay control information can be received by transmitting copies of at least one part of the relay control information on two OFDM symbols in the sub-frame. This concept can also be applied to the transmission of data to the relay node (relay data) or the transmission of reference symbols to the relay node.

What part of the relay control information (or relay data) is included twice in the OFDM symbols of the sub-frame is depending on the multiplexing strategy for mapping the relay control information (or relay data) and other information to the individual OFDM symbols of the sub-frame. If for example a time division multiplex is used, all relay control information (or relay data) for the relay nodes may be for example comprised within a single OFDM symbol. In this example identical copies of the relay control information is transmitted within two OFDM symbols of the sub-frame. If a FDM approach is used, the relay control information (or relay data) may be included in multiple OFDM symbols, but in a limited number of frequency resources such as individual subcarriers of the OFDM symbols. In this case, at least a portion of the relay control information (or relay data) is comprised within two OFDM symbols.

The OFDM symbols where the copies of the (portion of) relay control information (or relay data) is comprised is preferably chosen such that each relay node can receive the at least one of the two OFDM symbols comprising the copies of the (portion of) relay control information (or relay data). Hence, although the propagation delay may be unknown to the Node B, it may still ensure that all relay control information (or relay data) required by a respective relay node to receive data within the sub-frame can be read by the respective relay node.

In cases where the Node B is aware of the propagation delay of the radio signal, i.e. in cases where the Node B is aware of which subset of the OFDM symbols within the sub-frame a relay node can receive, the Node B may take into account this knowledge to map control information (and data) for the relay node to the appropriate OFDM symbols in the sub-frame receivable by the relay node.

In one exemplary embodiment, a sub-frame for transmission from a Node B to at least one relay node is defined. The sub-frame can be assumed to consist of an integer number of OFDM symbols 1 to n. The sub-frame conveys data and control information to user equipments communicating with the Node B via a direct air interface and/or via at least one relay node. The sub-frame further conveys relay control information and/or data to at least one relay node (i.e. one or more relay nodes). Identical relay control information for the at least one relay node is transmitted within at least two OFDM symbols j and k out of the n OFDM symbols. Note that identical relay control information means identical with respect to the meaning of the control information, i.e. it is possible that the identical relay control information are subject to different coding, modulation, and/or physical resource mapping, etc.

This configuration should ensure that the relay node is receiving either OFDM symbol j or OFDM symbol k of the sub-frame transmitted by the Node B. Formulated differently, only a subset of OFDM symbols out of the OFDM symbols 1 to n can be received by the at least one relay node, and a respective relay node is required to receive at least OFDM symbol j or k. The actual subset of OFDM symbols that can be received by a respective relay node may for example depend on the signal propagation delay experienced when transmitting the individual OFDM symbols from the Node B to the respective relay node and the switching of a relay node between transmission mode and reception mode within the period of time in which the sub-frame is transmitted by a Node B. Especially, when the relay node is switching between transmission mode and reception mode within the sub-frame the necessary hardware/software delay imposed thereby may lead to the relay node not being able to receive one or more OFDM symbols.

In one example, it may be assumed for exemplary purposes that the subset of OFDM symbols that can be received by the relay nodes are OFDM symbols j (j>1) to k (k<n), and OFDM symbols j and k convey said relay control information for the at least one relay node (Please note that this range of symbols OFDM symbols j to k is the maximum range of OFDM symbols that can be received, individual relay nodes may only receive a sub-range thereof, i.e. either OFDM symbols j or k).

In one further exemplary embodiment, each OFDM symbol consists of plural modulation symbols modulated on different subcarriers of the available bandwidth (here, available bandwidth means the bandwidth of the subcarriers in the system that carry information which is not necessarily equivalent to the subcarriers existing in the system). In this example a TDM approach is assumed so that the relay control information for a respective relay node is modulated to at least a subset of the modulation symbols of OFDM symbols j and k, respectively. Furthermore, in this example the subset of the modulation symbols within each OFDM symbol j and k to which relay control information for a respective relay node is modulated may be for example corresponding to an integer number of control channel elements.

In another exemplary embodiment, the subset of OFDM symbols that can be received by the at least one relay node are again OFDM symbols j (j>1) to k (k<n) and the OFDM symbols j and k convey copies of a portion of said relay control information for the at least one relay node, while the remaining portion of said relay control information for the at least one relay node is modulated to at least one other OFDM symbol of said subset of OFDM symbols j to k. In this FDM approach for multiplexing the relay control information, each OFDM symbol may for example consist of plural modulation symbols modulated on different subcarriers of the available bandwidth, and the relay control information for a respective relay node is mapped to plural modulation symbols within OFDM symbols j to k.

In another embodiment of the invention, the first m OFDM symbols 1 to m (m<n) of OFDM symbols 1 to n forming the sub-frame convey control information for user equipments communicating with the Node B via a direct air interface.

Another aspect of the invention is the operation of a relay node to receive sub-frames from a Node B. Accordingly, another embodiment of the invention is providing a method for operating a relay node within a temporal duration of a sub-frame. The sub-frame is divided into a plural OFDM symbols. The method comprises the relay node switching between a transmission mode and a reception mode within said duration of the sub-frame. Further, the relay mode, when being in the transmission mode, is transmitting within a first subset of OFDM symbols within the sub-frame control information for receivers connected to the relay node via a direct air interface, and when being in the receiving mode, the relay node is a second subset of OFDM symbols within the sub-frame from a Node B, wherein said second subset of OFDM symbols comprises at least one of two OFDM symbols (denoted j and k) containing identical relay control information for the relay node.

In a further embodiment of the invention, the sub-frame is constructed according to one of the various embodiments presented herein.

In a further embodiment of the invention, the relay node is extracting relay control information from at least one of the two OFDM symbols carrying same, i.e. from j symbols and/or k. The relay node is using the extracted relay control information to decode/extract the data transmitted from the Node B to the relay node within said second subset of OFDM symbols.

In one example, the second subset of OFDM symbols is either OFDM symbols j to k−1 or OFDM symbols j+1 to k, and the relay node is extracting the relay control information from OFDM symbols j to k−1 or OFDM symbols j+1 to k of said sub-frame to use them for decoding/extracting the (user) data transmitted to the relay node by the Node B.

In some embodiments, the transmission timing of sub-frames is synchronized between the Node B and the relay node. Alternatively, if the transmission of sub-frames is not synchronized, it is advantageous if the Node B is aware of the time shift in the transmission timing of sub-frames sent by Node B and relay node.

A further aspect of the invention is the operation of a Node B transmitting sub-frames on the downlink. According to another embodiment of the invention a method for use in a Node B and for transmitting n OFDM symbols forming a sub-frame is provided. According to this method, the Node B schedules user equipments and relay nodes, thereby deciding on a per-sub-frame basis on the user equipments and relay nodes to be allocated on the OFDM symbols forming a sub-frame. The Node B further generates the n OFDM symbols forming the sub-frame obeying the rule of transmitting identical relay control information for the relay nodes scheduled within at least two OFDM symbols (denoted j and k) out of the n OFDM symbols of the sub-frame. The sub-frame is then transmitted by the Node B.

In another embodiment of the invention, in generating the sub-frame, the further rule of the relay control information and data destined to a relay node being mapped on OFDM symbols of the sub-frame that can be received by the respective relay node is obeyed by the Node B.

In a further embodiment of the invention, when generating the sub-frame, the Node B obeys the following further rules:
control information related to data destined to user equipments communicating with the Node B via a direct air interface is mapped to the first m OFDM symbols of a sub-frame, and
data destined to user equipments is mapped on OFDM symbols of a sub-frame other than the first m OFDM symbols.

In another embodiment of the invention the Node B generates a sub-frame according to one the various embodiments described herein.

In a further embodiment of the invention, the Node B—when generating the sub-frame for transmission—decides whether to include relay control information for a respective relay node to be allocated in OFDM symbol j or k of the sub-frame depending on a known or estimated signal propagation delay between the Node B and the respective relay node. Hence, in this embodiment the Node B is assumed to have information available that allows the estimation of the signal propagation delay which is considered by the Node B in mapping the relay control information (and user data) for a relay node to certain OFDM symbols within the sub-frame.

In another embodiment of the invention, when generating the sub-frame for transmission comprises the Node B is deciding whether to include relay control information for a respective relay node to be allocated in OFDM symbols j to k−1 or in OFDM symbols j+1 to k of the sub-frame depending on a known or estimated signal propagation delay between the Node B and the respective relay node.

A further embodiment of the invention is providing a relay node for transmitting and receiving data in a communication system within a sub-fame. This relay node is comprising a processing unit for switching between a transmission mode and a reception mode within said duration of the sub-frame, a transmitter for transmitting in said transmission mode and within a first subset of OFDM symbols within the sub-frame control information for receivers connected to the relay node via a direct air interface, and a receiver for receiving in said receiving mode a second subset of OFDM symbols within the sub-frame from a Node B, wherein said second subset of OFDM symbols comprises at least one of two OFDM symbols (j and k) containing identical relay control information for the relay node.

The relay node according to another embodiment of the invention, further comprising means adapted to perform the method for operating a relay node according one of the various embodiments discussed herein.

A further embodiment of the invention is providing a Node B for transmitting an n OFDM symbols forming a sub-frame. The Node B comprises a scheduler for scheduling user equipments and relay nodes by the Node B, thereby deciding on a per-sub-frame basis on the user equipments and relay nodes to be allocated on the OFDM symbols forming a sub-frame, and a processing unit for generating the n OFDM symbols forming the sub-frame such that the rule of identical relay control information for the relay nodes scheduled being transmitted within at least two OFDM symbols (j and k) out of the n OFDM symbols of the sub-frame is obeyed. Furthermore, the Node B comprises a transmitter for transmitting the sub-frame by the Node B.

The Node B according to another embodiment of the invention further comprises means adapted to perform the steps of the method for transmitting n OFDM symbols by a Node B according to one of the various embodiments described herein.

Another aspect of the invention is the implementation of the various methods in software. According to a further embodiment, the invention is providing a computer readable medium storing instructions that, when executed by a processor of a relay node, cause the relay node to switch between a transmission mode and a reception mode within said duration of the sub-frame, and to transmit in said transmission mode and within a first subset of OFDM symbols within the sub-frame control information for receivers connected to the relay node via a direct air interface. Furthermore, the instructions cause the relay node to receive in said receiving mode receiving a second subset of OFDM symbols within the sub-frame from a Node B, wherein said second subset of OFDM symbols comprises at least one of two OFDM symbols (j and k) containing identical relay control information for the relay node.

The computer readable medium according to another embodiment of the invention stores instructions that, when executed by the processor of the relay node, cause the relay node to perform the steps of the method for operating a relay node according to one of the various embodiments discussed herein.

Another exemplary embodiment of the invention is related to a computer readable mediums storing instructions that, when executed by a processor of a Node B, cause the Node B to transmit n OFDM symbols forming a sub-frame by a Node B. The instructions cause the Node B to schedule user equipments and relay nodes by the Node B, thereby deciding on a per-sub-frame basis on the user equipments and relay nodes to be allocated on the OFDM symbols forming a sub-frame, and to generate the n OFDM symbols forming the sub-frame obeying the rule of transmitting identical relay control information for the relay nodes scheduled within at least two OFDM symbols (j and k) out of the n OFDM symbols of the sub-frame. Furthermore, the instructions stored on the computer readable medium—when executed by the Node B's processor, further cause the Node B to transmit the sub-frame.

The computer readable medium according a further embodiment of the invention stores instructions that, when executed by the processor of the Node B, cause the Node B to perform the steps of the method for transmitting n OFDM symbols by a Node B according to one of the various embodiments described herein.

BRIEF DESCRIPTION OF THE FIGURES

In the following, the invention is described in more detail in reference to the attached figures and drawings. Similar or corresponding details in the figures are marked with the same reference numerals.

DETAILED DESCRIPTION OF THE INVENTION

The following paragraphs will describe various embodiments of the invention. For exemplary purposes only, most of the embodiments are outlined in relation to an (evolved) communication system according to LTE and its currently developed advancements discussed in the Technical Background section above.

Figure 1:
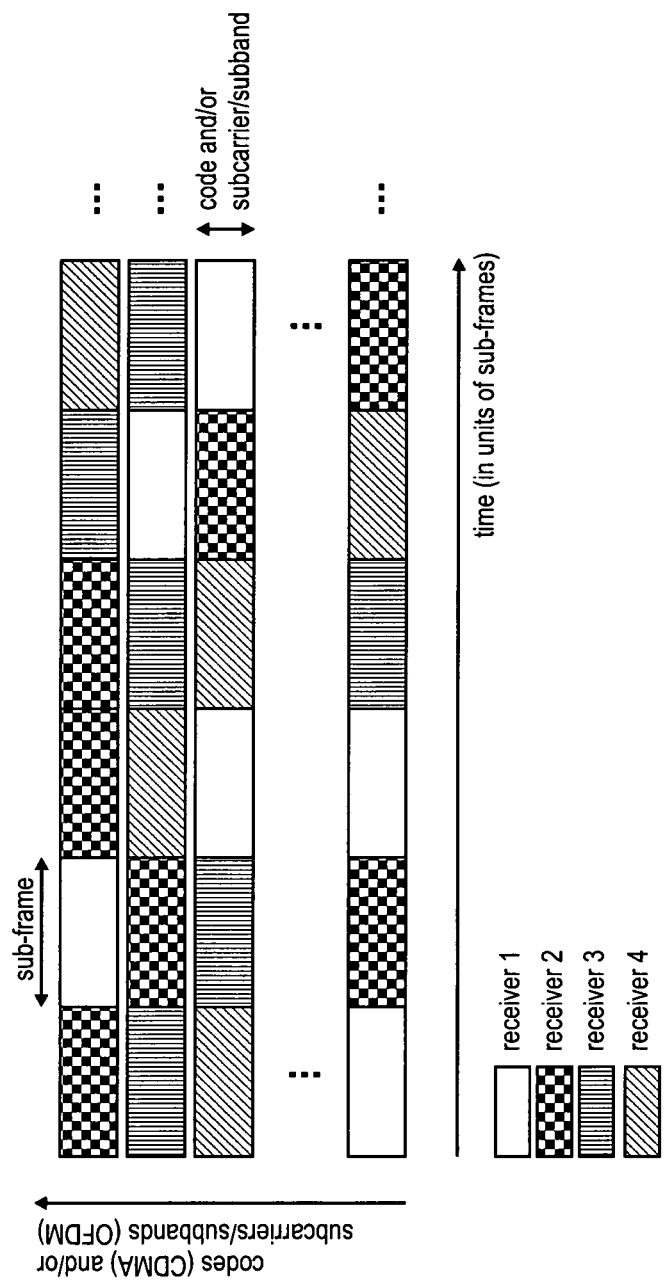
FIG. 1 shows an exemplary packet scheduling for four receivers on Shared Data CHannel (SDCH) of a LTE Rel. 8 system.
Figure 2:
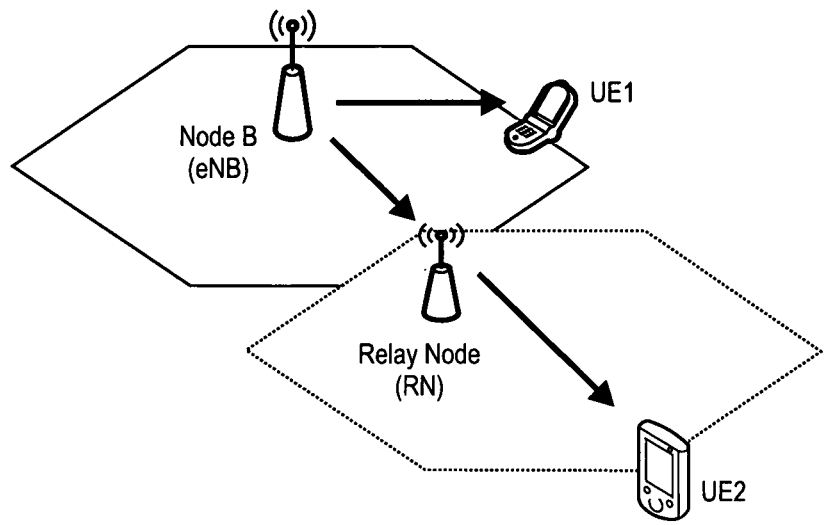
FIG. 2 shows an exemplary network configuration of a Node B (eNB), a relay node (RN) and two user equipments (UE1 and UE2)
Figure 3:
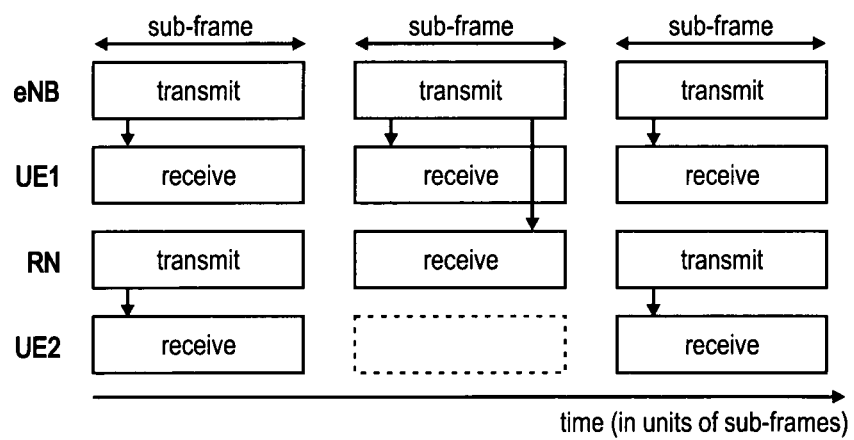
FIG. 3 shows an exemplary behavior of the entities in FIG. 2 with respect to their operation in transmission mode and reception mode.
Figure 4:
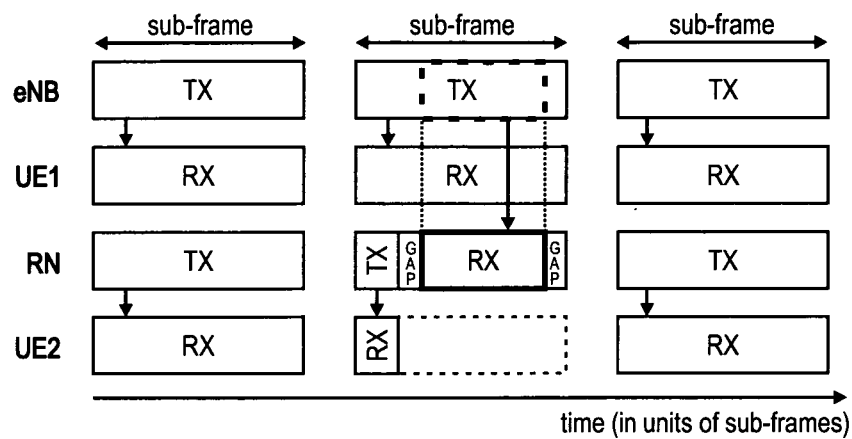
FIG. 4 shows an exemplary backward-compatible behavior of the entities in FIG. 2 with respect to their operation in transmission mode and reception mode in an enhanced communication system.
Figure 5:
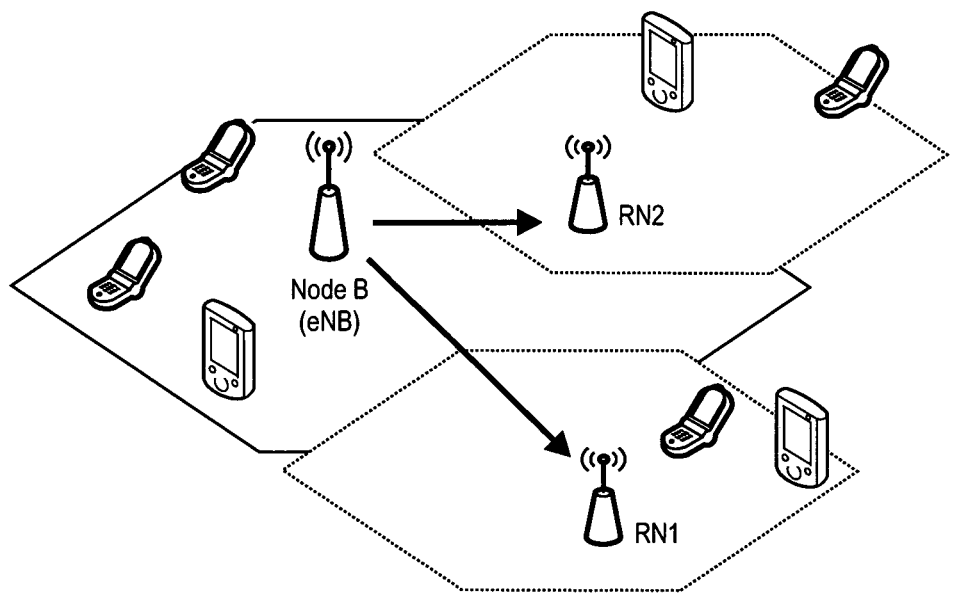
FIG. 5 shows another exemplary network configuration of a Node B (eNB), multiple relay nodes (RN1 and RN2) and multiple user equipments based on which the concepts of this invention are exemplified, FIG. 6 exemplary illustrates the reception of a sub-frame from a Node B at different relay nodes and the transmission windows and reception windows of the relay nodes, taking into account the variable propagation delay of transmission signals between the Node B (eNB) and relay nodes (RN1 and RN2) and a switching between transmission mode and reception mode within the sub-frame at the relay nodes.
Figure 6:
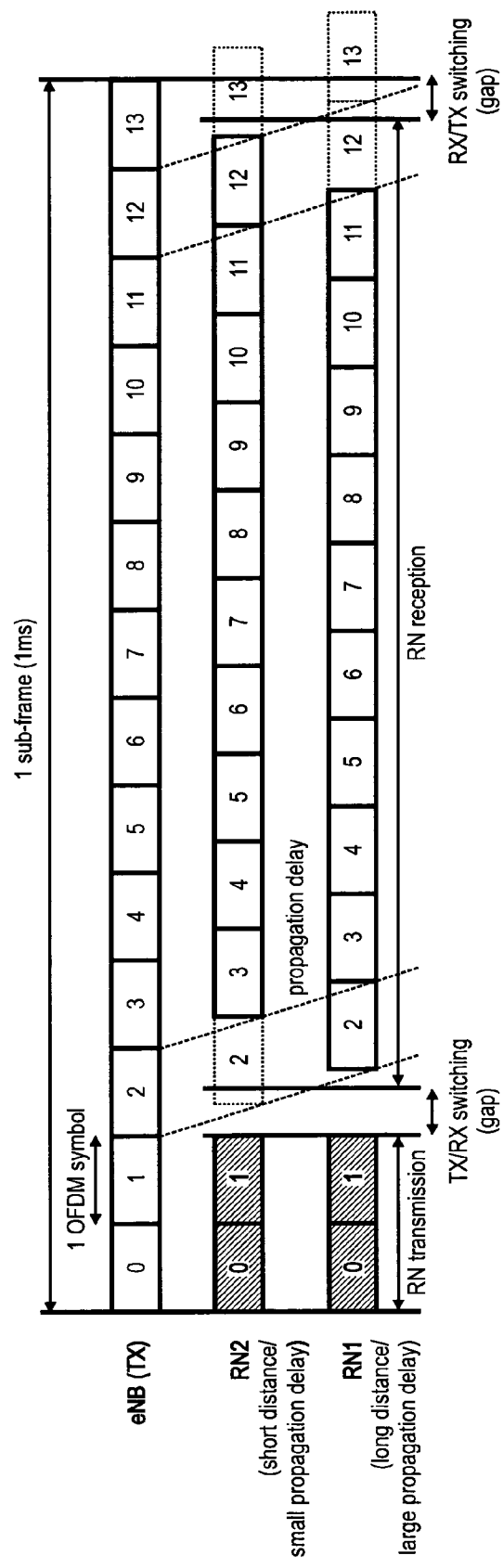

One possible solution to the problem of defining a sub-frame format suitable for transmission to relay nodes in view of propagation delays and switching between transmission mode and reception mode at the relay node during transmission of the sub-frame is exemplary shown in FIG. 6. FIG. 6 shows a sub-frame (in the time-frequency domain), which is consisting of n=14 OFDM symbols. L1/L2 control information (also referred to as PDCCHs) directed to receiving nodes (i.e. user equipments) that are directly connected to the Node B is included in the first m=2 OFDM symbols #0 and #1. The region where both relay nodes RN1 and RN2 (compare FIG. 5) are able to receive data from the Node B ranges from OFDM symbols #3 to #11.

Therefore, in order to ensure that both relay nodes are capable of receiving the control signaling directed to them it, the relay control information region, i.e. where the L1/L2 control information directed to the relay nodes is transmitted, should be located well inside that range of OFDM symbols #3 to #11 that can be received by both relay nodes. It would be further beneficial to map the relay control information to a relay control channel region of the sub-frame that is on or near those OFDM symbols where reference symbols are transmitted, so as to improve the accuracy of the channel estimation for demodulation of the relay control channel.

For example, in the LTE structure of a sub-frame where a sub-frame consists of 14 OFDM symbols at least OFDM symbol #7 comprises reference symbols. Hence, in the example shown in FIG. 7 the Relay Control Channel (RCC)—conveying the L1/L2 control information to the relay nodes—is transmitted within OFDM symbol #7, together with reference symbols (which are not shown for simplicity). OFDM symbols #0 and #1 carry the L1/L2 control channels (CCH) directed towards LTE user equipments (also commonly referred to as Physical Downlink Control Channels (PDCCHs) to the user equipments). Generally symbols #2 to #13 carry the Shared Data CHannel, i.e. the (user) data (please note that user data signaled to the user equipments is not shown for simplicity). However, symbols #2, #12, and #13 should be not used at all or at least no information for the relay nodes should be scheduled and transmitted on these OFDM symbols. As outlined previously, OFDM symbols #2, #12, and #13 may not be inside every relay nodes' reception window. Consequently only OFDM symbols #3 to #6 and #8 to #11 should carry a relay data channel (RDC). An alternative representation of the same figure which is slightly more abstract version is shown in FIG. 8 assuming a time multiplex of the relay control information (RCC region). As can be seen from FIG. 7 and FIG. 8, using this solution three out of n=14 OFDM symbols of the sub-frame cannot be used for conveying information to the relay nodes.

In order to further increase the capacity for the transmission of (user) data to the relay nodes, one aspect of the invention proposes an enhanced sub-frame structure. According to this aspect of the invention, the relay control information (or data transmitted to the relay node(s)) is transmitted in multiple OFDM symbols (n OFDM symbols), such that each relay node is able to detect at least one of those OFDM symbols. The content of the relay control channel (respectively, the relay data channel) in those symbols is preferably identical.

For example for LTE-based mobile communication systems, the proposed solution may reduce the complexity of the control channel (or data channel) layout algorithm since it does not need to take the reception windows of the individual receivers into account when performing resource planning (scheduling) and mapping of control channel information to the physical channel resources, i.e. to the resource element groups or control channel elements (CCE)—see 3GPP TS 36.211, "Evolved Universal Terrestrial Radio Access (E-UTRA); Physical Channels and Modulation (Release 8)", version 8.6.0, section 6.8, available at http://www.3gpp.org and incorporated herein by reference.

Figure 9:
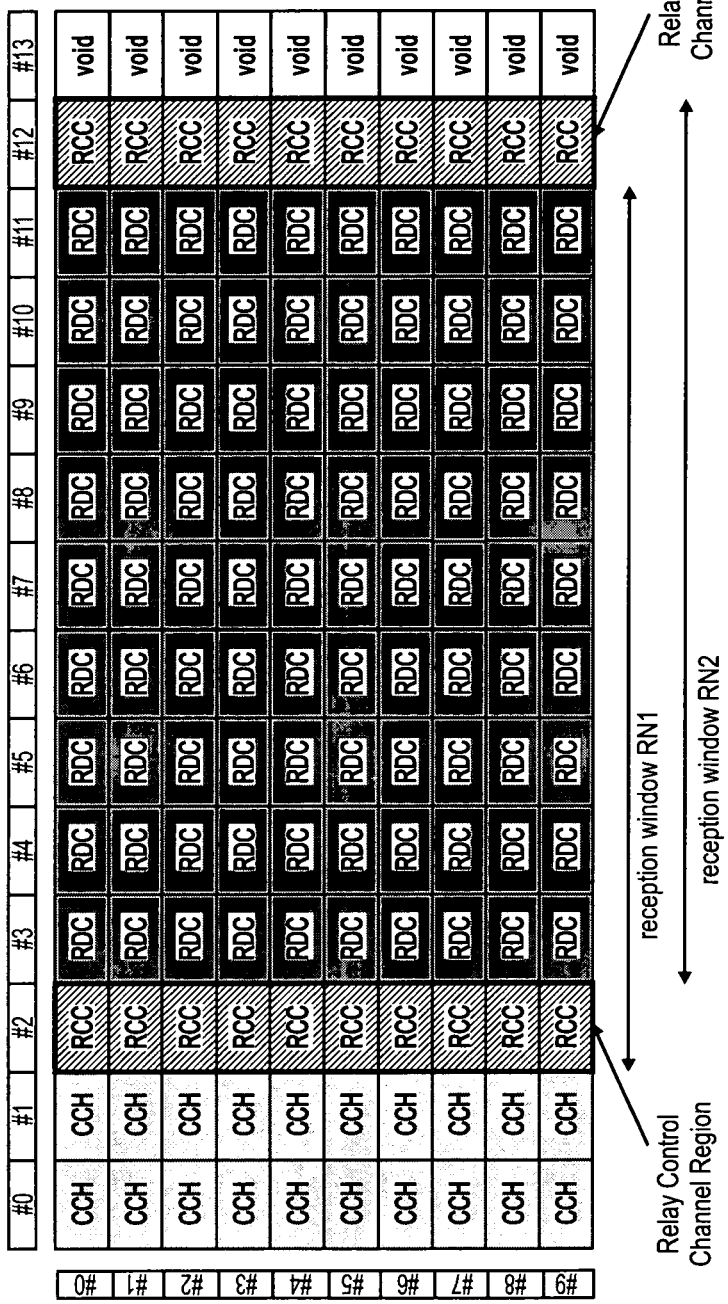
Figure 10:
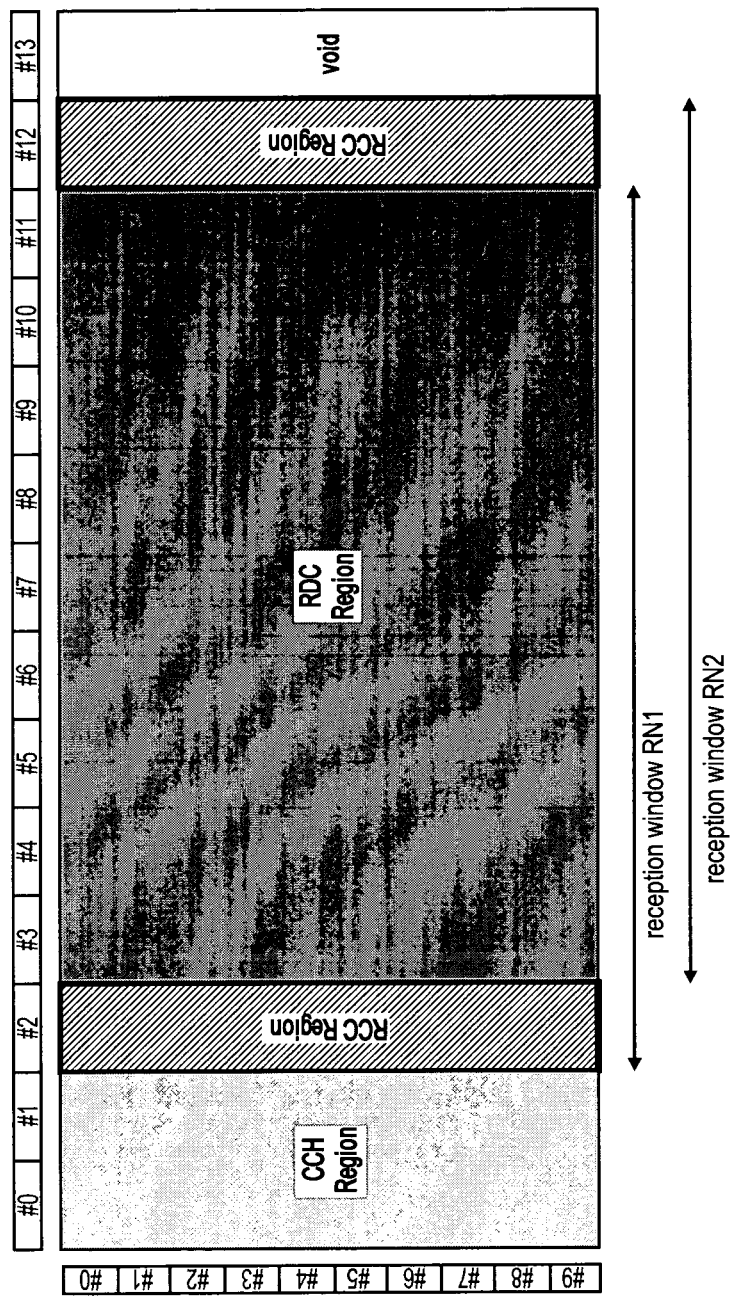

FIG. 9 and FIG. 10 show an exemplary sub-frame structured according to this aspect of the invention. Again the sub-frame is assumed to consist of n=14 OFDM symbols, of which the first m=2 OFDM symbols with indices #0 and #1 are used for the L1/L2 control channels (PDCCHs) for the user equipments. Of course parameters n and m are only chosen for exemplary purposes and may vary. Similarly, it is also possible to include control channels for the user equipments in different locations than the beginning of the sub-frame, which may however be more difficult to handle when performing resource planning (scheduling) and mapping of control channel information, but is nevertheless is possible.

In the exemplary embodiment of the invention shown in FIG. 9 and FIG. 10 it is assumed that the relay nodes have different reception windows in a subset or sub-range of the OFDM symbols forming the sub-frame. The earliest OFDM symbol at least one of the relay nodes can receive is assumed to be OFDM symbol #2 (index j) while the last OFDM symbol at least one of the relay nodes can receive is OFDM symbol #12 (index k). The reception windows of the relay nodes are therefore assumed to span either OFDM symbols #2 to #11 (i.e. j to k−1) or OFDM symbols #3 to #12 (i.e. j+1 to k). Hence, if the relay control information is mapped to symbols #2 and #12 all relay nodes in the radio cell of a Node B can either receive OFDM symbol #2 or OFDM symbol #12 within their respective reception windows. Therefore, the L1/L2 control channel information directed towards relay nodes (relay control information) should be transmitted in both OFDM symbols. Advantageously, the relay control information contained in OFDM symbol #2 is identical to the information contained in OFDM symbol #12.

Figure 7:
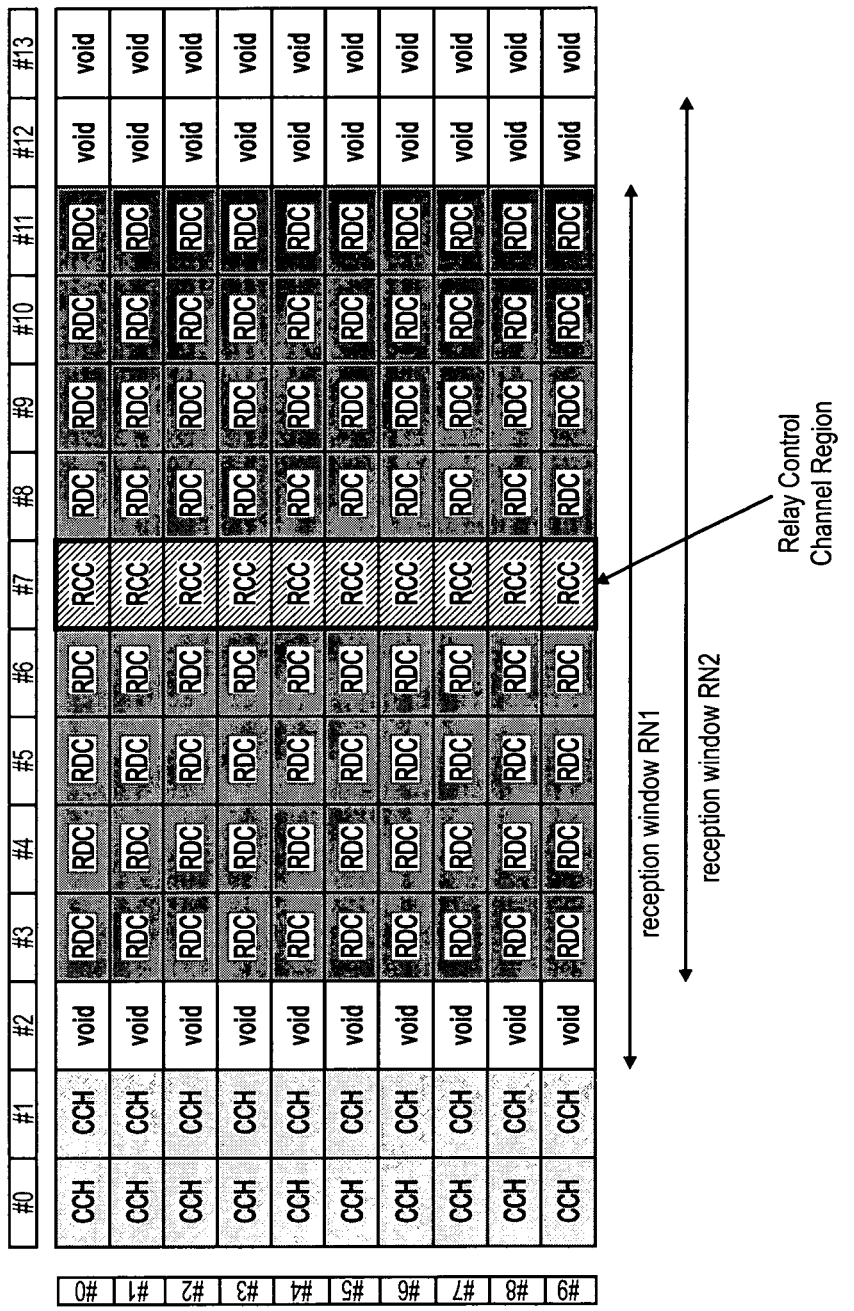
FIGS. 7 & 8 show an exemplary sub-frame for transmission by a Node B to the relay nodes assuming the variable propagation delay of transmission signals and switching of the relay nodes' operation mode as shown in FIG. 6, FIGS. 9 to 12 show different exemplary sub-frames according to different embodiments of the invention for transmission by a Node B to the relay nodes assuming the variable propagation delay of transmission signals and switching of the relay nodes' operation mode as shown in FIG. 6, FIG. 13 exemplary illustrates the reception of a sub-frame from a Node B at different relay nodes and the transmission windows and reception windows of the relay nodes, taking into account the variable propagation delay of transmission signals between the Node B (eNB) and relay nodes (RN1 and RN2) and a switching between transmission mode and reception mode within the sub-frame at the relay nodes, whereby relay node RN1 is located far away from the Node B.
Figure 8:
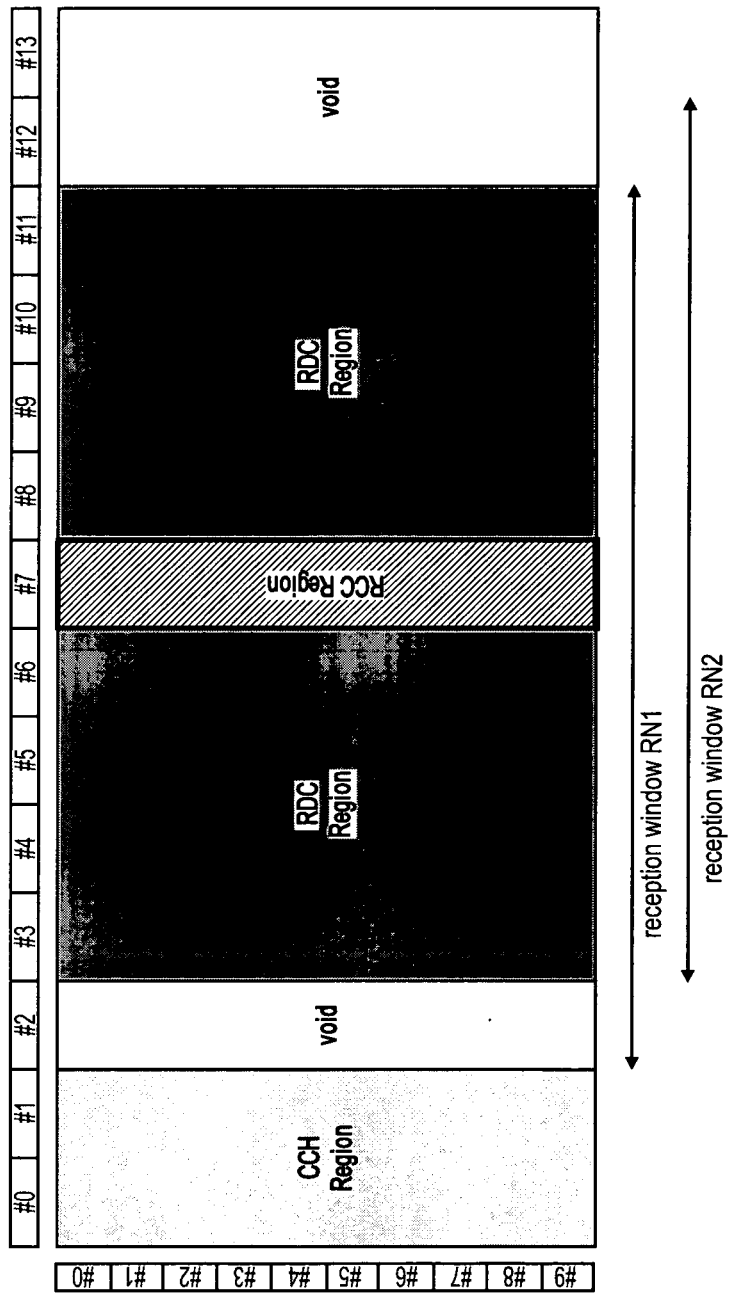

As can be recognized from comparing FIG. 9 and FIG. 10 with FIG. 7 and FIG. 8, the exemplary sub-frame according to this aspect of the invention allows for using nine contiguous OFDM symbols for user data transmission to the relay nodes, in comparison to the eight non-contiguous OFDM symbols in the solution according to FIGS. 6, 7 and 8. Furthermore, the Node B can construct the relay control channel without having to care about the reception windows of the attached relay nodes, as long as each relay is able to detect at least one of the Relay Control Channel (RCC) regions. This may be assured by proper planning of the network infrastructure and cells.

As indicated above, the exemplary sub-frame structure is containing n=14 OFDM symbols. The aspects of this invention however also be can be applied to other scenarios (e.g. with only n=12 OFDM symbols). The underlying concept of the above discussed aspect of this invention can be preserved in that information that is transmitted in OFDM symbols of a sub-frame that only part of the receivers (relay nodes) can see is to be repeated in OFDM symbols that the remaining receivers can see. Hence, this concept may not only be used for control information destined to the relay nodes, but may also be employed for user/relay data, if for example user/relay data and control information for the relay nodes is transmitted within the same OFDM symbol. Here, user data is referring to data destined to a user equipment, while relay data is referring to data destined to a relay node.

Figure 11:
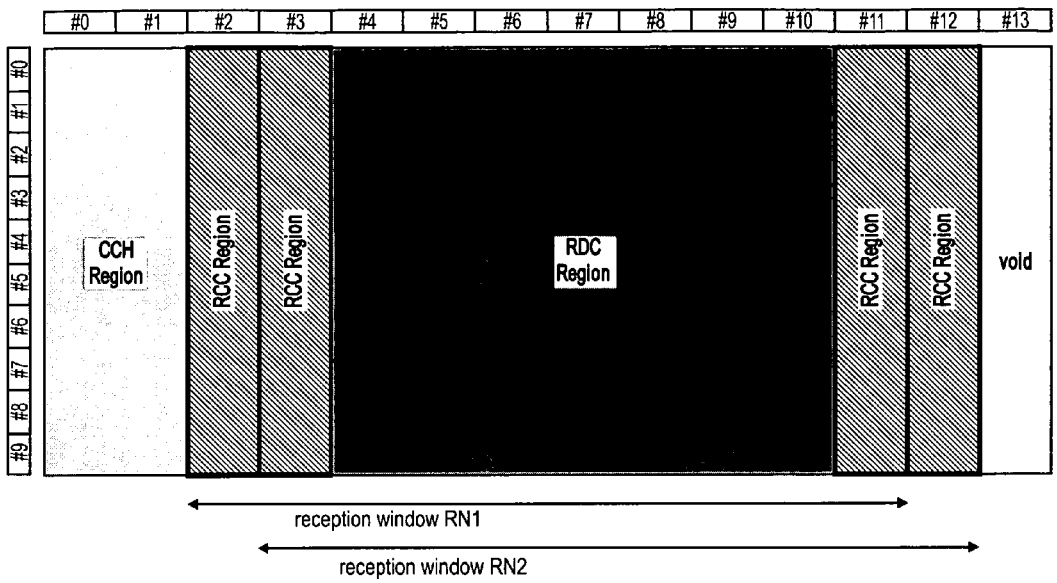

Furthermore, there may also exist situations, where the relay control channel (RCC) region needs to contain more L1/L2 control messages for relay nodes that than actually fitting into a single OFDM symbol. An example is shown in FIG. 11, where the content of OFDM symbol #2 is repeated in OFDM symbol #11, and the content of OFDM symbol #3 is repeated in symbol #12. However, since generally it can be assumed that the number of relay nodes in a cell attached to a Node B is substantially smaller than the number of user equipments attached to the Node B, it can be assumed that one OFDM symbol is sufficient provided that a sufficient space in the frequency domain is available.

Figure 12:
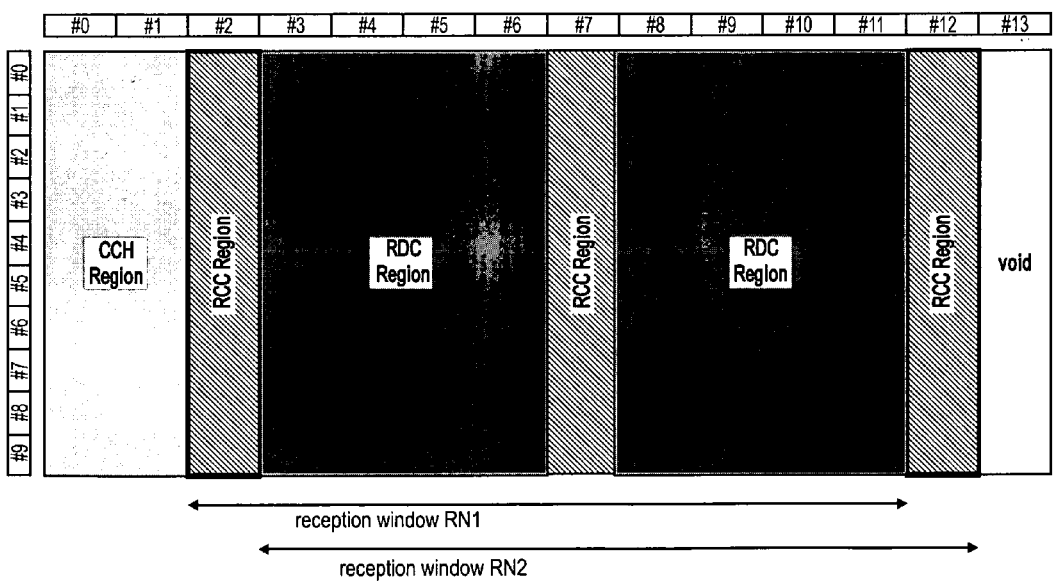

Another possibility for an exemplary sub-frame according to another embodiment of the invention is shown in FIG. 12. In this example, the solutions proposed with respect to FIG. 8 and FIG. 10 are combined to provide sufficient capacity within the sub-frame to convey the relay control information in the RCC regions. Assuming a TDM multiplexing of the relay control information, OFDM symbol #2 is repeated in OFDM symbol #12 again, while the relay control information in OFDM symbol #7 can be received by both relay nodes RN1 and RN2 when referring to the exemplary configuration of the communication system similar to the situation shown in FIG. 5. Here, OFDM symbol #7 has been chosen to carry the excess relay control information for the relay nodes not fitting into OFDM symbol #2, respectively #12, since it may be further assumed that OFDM symbol #7 is also carrying reference symbols thereby improving the detection of the relay control information. It should be noted that the excess relay control information could also be conveyed on any other OFDM symbol that can be received by both (all) relay nodes. Likewise, in case the capacity offered by the sub-frame structure shown in FIG. 12 for the relay control information is insufficient, the structure can be extended to include more OFDM symbols that can be received by both (all) relay nodes for an increase of the overall RCC region.

Essentially, this exemplary embodiment of FIG. 12 may also be considered in conjunction with frequency hopping of the contained information from OFDM symbol to OFDM symbol, while still keeping the concept of the content of what is mapped for a L1/L2 control channels for the relay node(s) in OFDM symbol #2 should be identical to that in OFDM symbol #12. The frequency hopping effect could for example be realized by repeating the information contained in OFDM symbol #2 at frequency element #1 in OFDM symbol #12 at frequency element #6. Furthermore, an additional hopping can be realized when assuming that the control (DCI) information occupies for example two CCEs. In this case, the first CCE could be transmitted in OFDM symbol #2 at frequency element #1, the second CCE could be transmitted in OFDM symbol #7 at frequency element #9, and the first CCE could be repeated in OFDM symbol #12 at frequency element #6.

Figure 13:
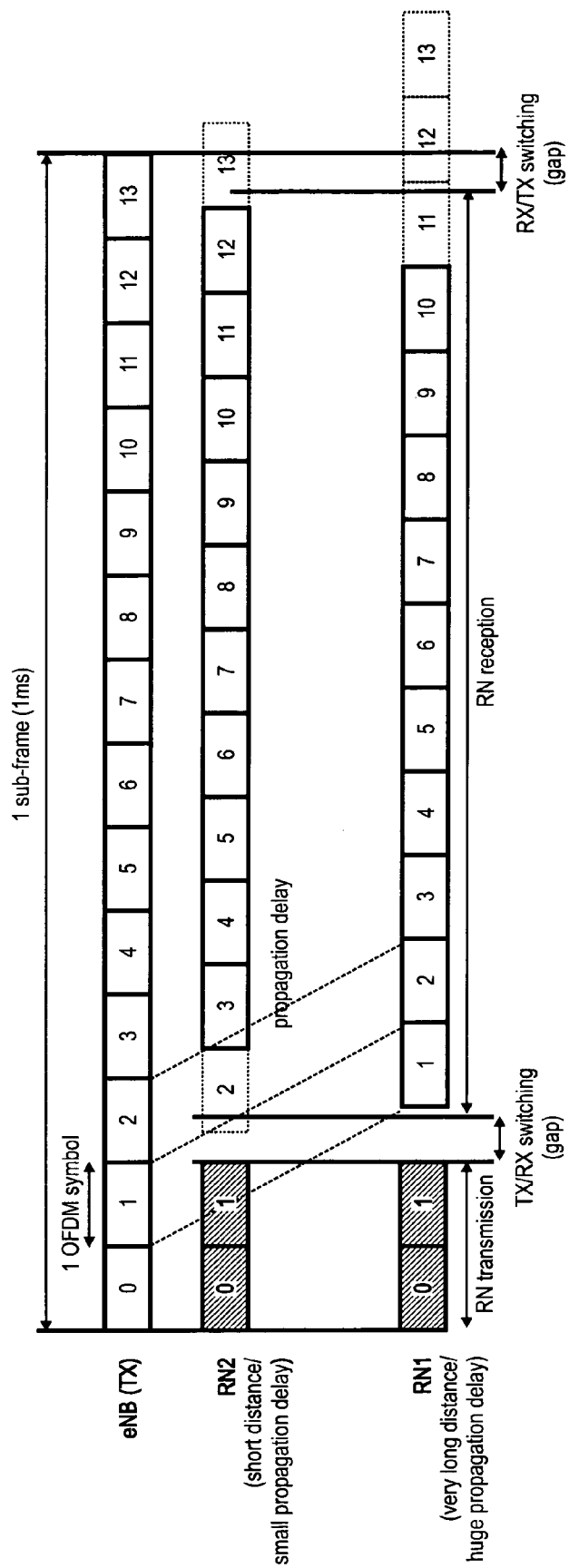

Another situation that can occur in a real system is that the propagation delay and processing gap for switching between transmission mode and reception mode in the relay node are larger than even a single OFDM symbol. For an LTE frame structure with n=14 OFDM symbols, the length of a typical OFDM symbol including the cyclic prefix is approximately in the range of 71.3 and 83.4 microseconds. Assuming a speed of light of ~300.000 m/s, this is equivalent to a distance between around 21 and 25 kilometers (even though the cyclic prefix may be excluded for this calculation, then resulting in slightly smaller distances). In case several relay nodes are deployed with minimum and maximum distances exceeding that range, a situation exemplary shown in FIG. 13 can occur. In this situation the reception window of a relay node (here RN1) located far from the Node B may cover OFDM symbols #1 to #10 completely instead of the previously indicated reception windows exemplary depicted in FIGS. 7 to 12. An exemplary sub-frame according to another embodiment of the invention that can be used in such cases where a relay node is known to be located far from the Node B (e.g. >25 km) is exemplified in FIG. 14. In this example it is assumed that there is a relay node RN1 located very far from the Node B so that its reception window covers OFDM symbols #1 to #10, while relay node RN2 is located close to the Node B such that its reception window covers OFDM symbols #3 to #12. In this exemplary sub-frame the content of OFDM symbol #1 is conveying the relay control information (and optionally further L1/L2 control information for user equipments) and is repeated in OFDM symbol #12 so that the relay control information can also be received by RN2.

Considering an LTE system, it may be assumed that the L1/L2 control information (PDCCs) for the user equipments (denoted CCH within the figures) is included in OFDM symbols #0 and #1. In this case OFDM symbol #1 for conveying the relay control information (i.e. part of the RCC region) may not be an optimal solution, since it is likely that its content is required to contain at least some L1/L2 control information for the user equipments, which would not be practical to be repeated in a later OFDM symbol. Accordingly, in an alternative implementation, that RCC region can be foreseen in OFDM symbol #2, so that it can be received by RN1 as for example shown in FIG. 8.

Figure 14:
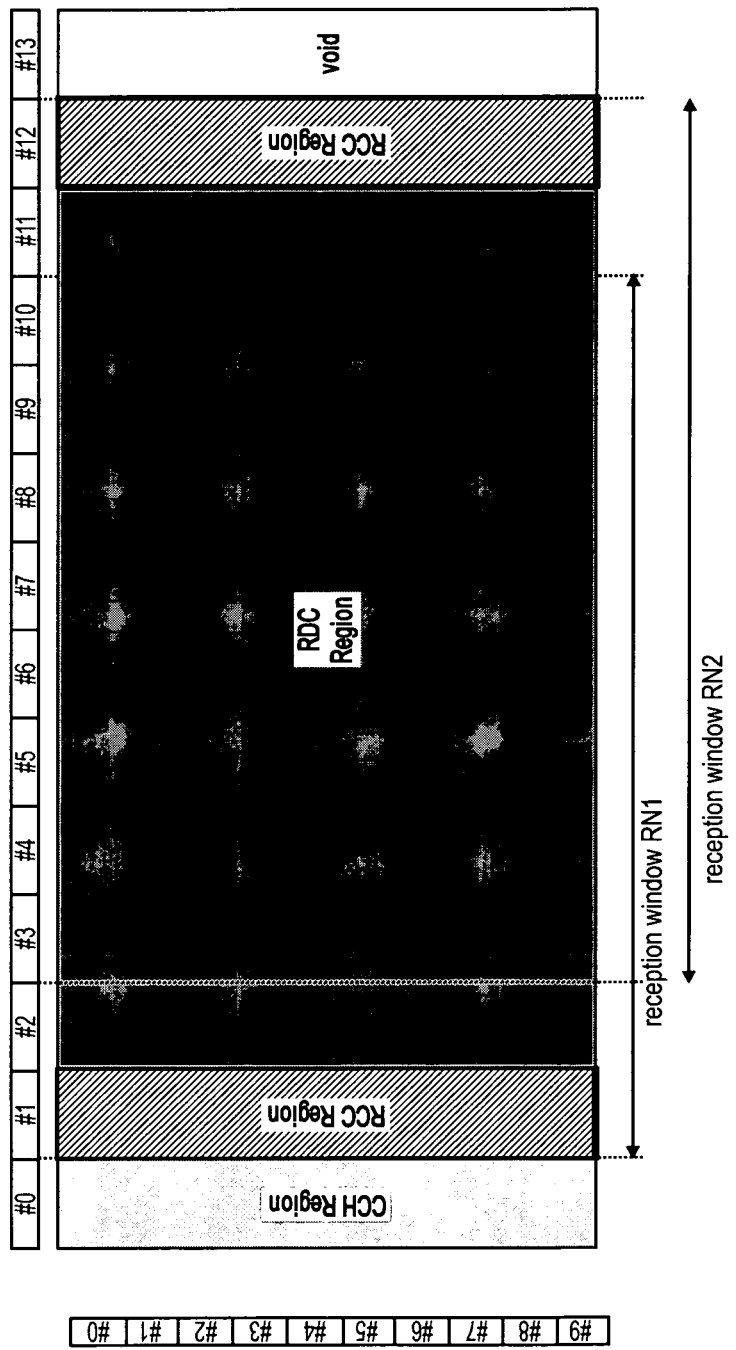
FIG. 14 shows an exemplary sub-frame according to an embodiment of the invention for transmission by a Node B to the relay nodes assuming the variable propagation delay of transmission signals and switching of the relay nodes' operation mode as shown in FIG. 13, FIGS. 15 to 19 show further different exemplary sub-frame according to different embodiments of the invention for transmission by a Node B to the relay nodes assuming the variable propagation delay of transmission signals and switching of the relay nodes' operation mode as shown in FIG. 6.

Another exemplary alternative implementation would be to use the sub-frame structure shown in FIG. 14, where only the control information (DCI) pertaining to relay nodes is repeated in OFDM symbol #12, instead of repeating also the control information for the user equipments, i.e. user equipment-related DCI information of symbol #1.

Of course, if there are situations where the propagation delay to a relay node is even larger than in the previous example, such that the relay node's reception window can cover OFDM symbols #0 to #9, the approach discussed above with respect to FIG. 14 can be applied mutatis mutandis to putting relay control information already in OFDM symbol #0 on the Node B transmitter side.

In the examples discussed above with respect to FIGS. 6 to 10 and 14, it has been assumed for exemplary purposes that the relay control information and the Relay Data Channel (RDC) region in the sub-frame are time multiplexed so that the relay control information fits into a single OFDM symbol. The OFDM symbol carrying the relay control information is repeated within the sub-frame, so that each relay node can receive at least one of the OFDM symbols carrying the relay control information irrespective of the actual receiving window of the relay node. For this purpose, the OFDM symbols carrying the relay control information are the first and the last OFDM symbol (with respect to their signal index) within the range of OFDM symbols of the sub-frame that can be received by the relay nodes (in the examples discussed above with respect to FIGS. 6 to 10 and 14, OFDM symbols k=2 to j=12).

Figure 15:
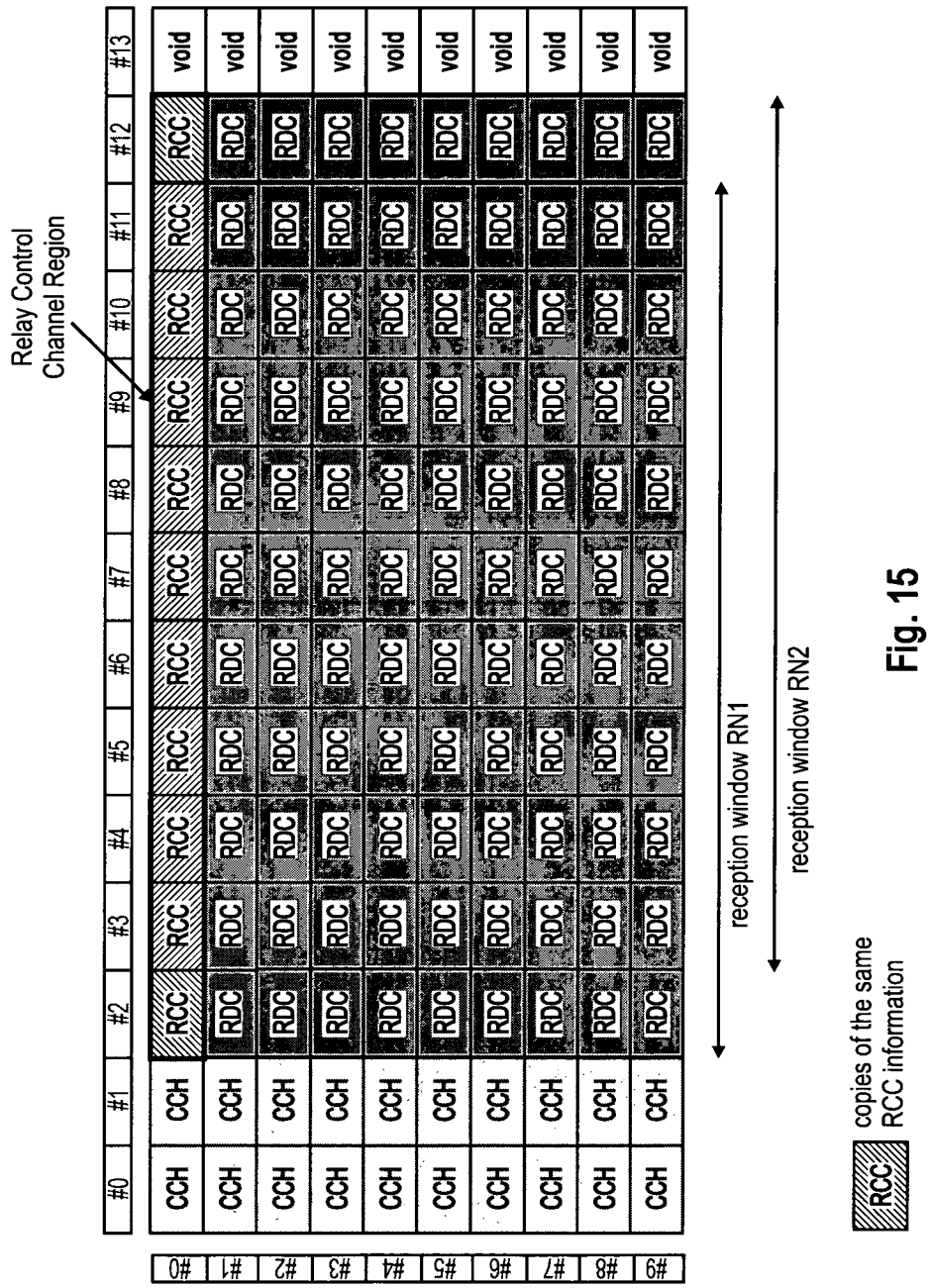

In another embodiment of the invention, this idea can be extended to the situation that the relay control channel is mapped across multiple OFDM symbols (e.g. in a frequency multiplex with the Relay Data Channel). An exemplary sub-frame structure where an FDM approach for mapping the control information for the relay nodes to the OFDM symbols of a sub-frame is shown in FIG. 15. In FIG. 15, the relay control information for the relay nodes is not just limited to symbols #2 and #12.

According to the exemplary embodiment of the invention exemplified in FIG. 15, still identical control information is mapped to the first and last OFDM symbol of the range of OFDM symbols of the sub-frame that can be received by the relay nodes. In this example the range of OFDM symbols that can be received by the relay nodes is indices #2 to #12, while identical copies of the part of the control information for the relay nodes mapped to OFDM symbol #2 are repeated in OFDM symbol #12.

Assuming that each relay node's reception window size is 10 OFDM symbols long, each relay node will be able to detect all parts of the relay control information, either in OFDM symbols #2 to #11 or in OFDM symbols #3 to #12. In order to detect the Relay Control Channel content, of course the symbols should be interpreted in the order as transmitted by the Node B, i.e. a relay node receiving OFDM symbols #3 to #12 may rearrange the contents of the symbols prior to decoding. In case the relay node is aware of its reception window, it can adapt its RCC detection algorithm accordingly, either by using the sequence of symbols #2, #3, #4, #5,

6, #7, #8, #9, #10, #11 (for RN1) or using the sequence #12, #3, #4, #5, #6, #7, #8, #9, #10, #11 (for RN2).

Even in case the relay node is not aware of its reception window, it can create two hypotheses according to the above approach and thereafter check which of the two hypotheses contains reasonable content. For example, one hint to the correct sequence of symbols contents may be a CRC checksum or parity checksum included in the Relay Control Channel region or within the individual control information.

Figure 16:
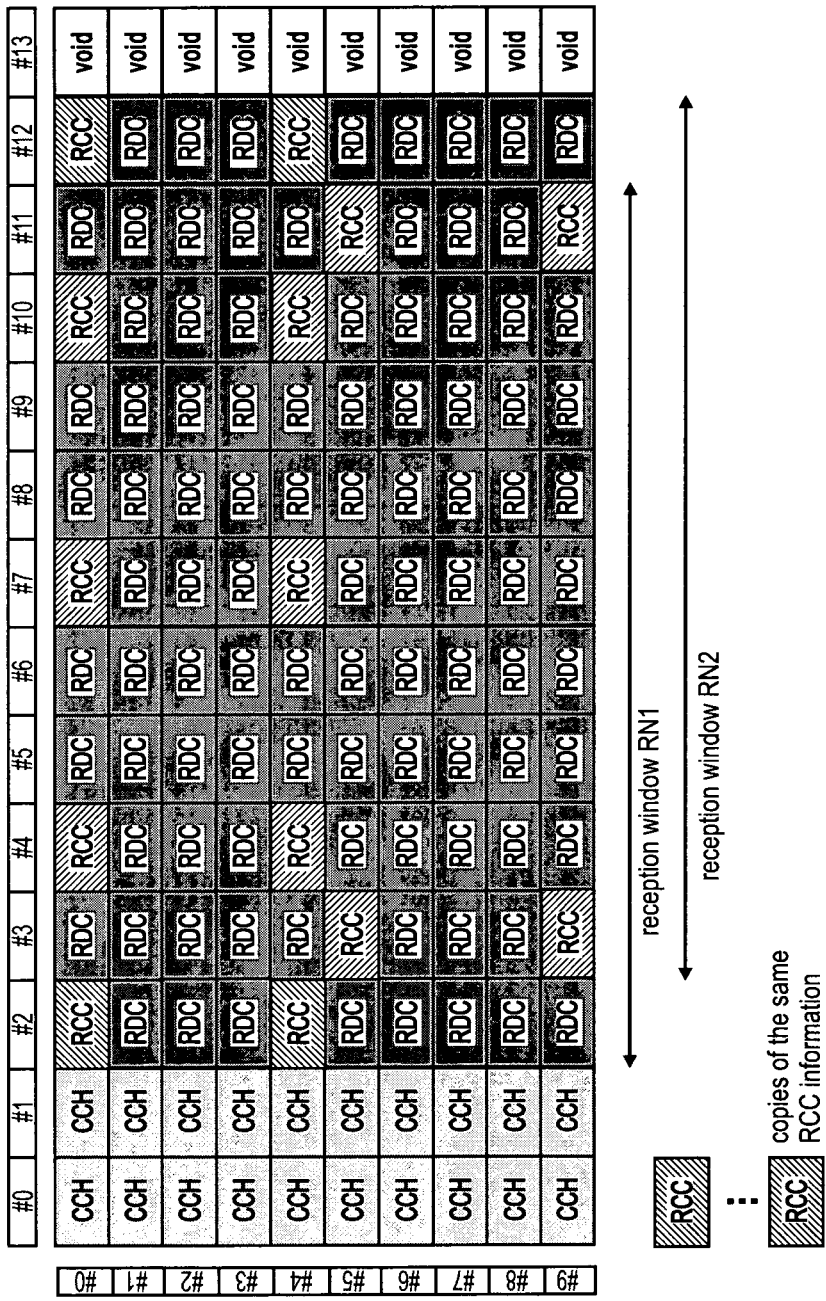

In FIG. 15, the Relay Control Channel Region has been exemplary assumed to be constrained to a certain frequency range (e.g. subband(s) or subcarrier(s)) of the OFDM symbol. However, as shown in the further example of FIG. 16, the relay control information may also be mapped to different modulation symbols of the OFDM symbols, i.e. mapped to different subband(s) or subcarrier(s) of the OFDM symbols bandwidth. In the example of FIG. 16 the relay control information is mapped to the OFDM symbols of a sub-frame according to a predetermined pattern, resulting in a Relay Control Channel Region that is scattered across the time-/frequency-domain. Also in this example, the portion of the relay control information in symbol #2 is repeated in symbol #12.

In the respective embodiments of the invention, the relay control channel is generally frequency-multiplexed with the data channel for user equipments or relay data channel. In other words, a part of the frequency range is reserved or used for the relay control information (RCC), while another part of the sub-frame is reserved or used for the user equipment or relay data channel. In such a case, the fundamental principle of the idea is preserved by having identical data mapped to the first and last OFDM symbol of the RCC as shown for example in FIG. 15. As mentioned before, the relay control channel region should contain L1/L2 control information to point to SDCH resources for a receiver or L1/L2 control information to allocate resources for the receiver that are to be used for transmission by the receiver. In the relay case, therefore a relay L1/L2 control channel should point to resources where data is allocated to a RN, or to resources that are to be employed by the relay node to transmit to the Node B. While it is beneficial to map and transmit the control channel in a shared manner and therefore applying the invention, it may be possible at the Node B to beneficially employ knowledge about the RNs' reception windows. For example in FIG. 15, in case that the Node B allocates frequency resources #1 to #5 to RN1, and it is aware that the reception window of RN1 is OFDM symbols #3-#12 as shown, the Node B does not need to transmit RDC content for RN1 in OFDM symbol #2 on those frequency resources, because it is aware that such information cannot be received by RN1 anyway. Therefore those resources can be nulled, i.e. zero transmission power is emitted for those resources.

Figure 17:
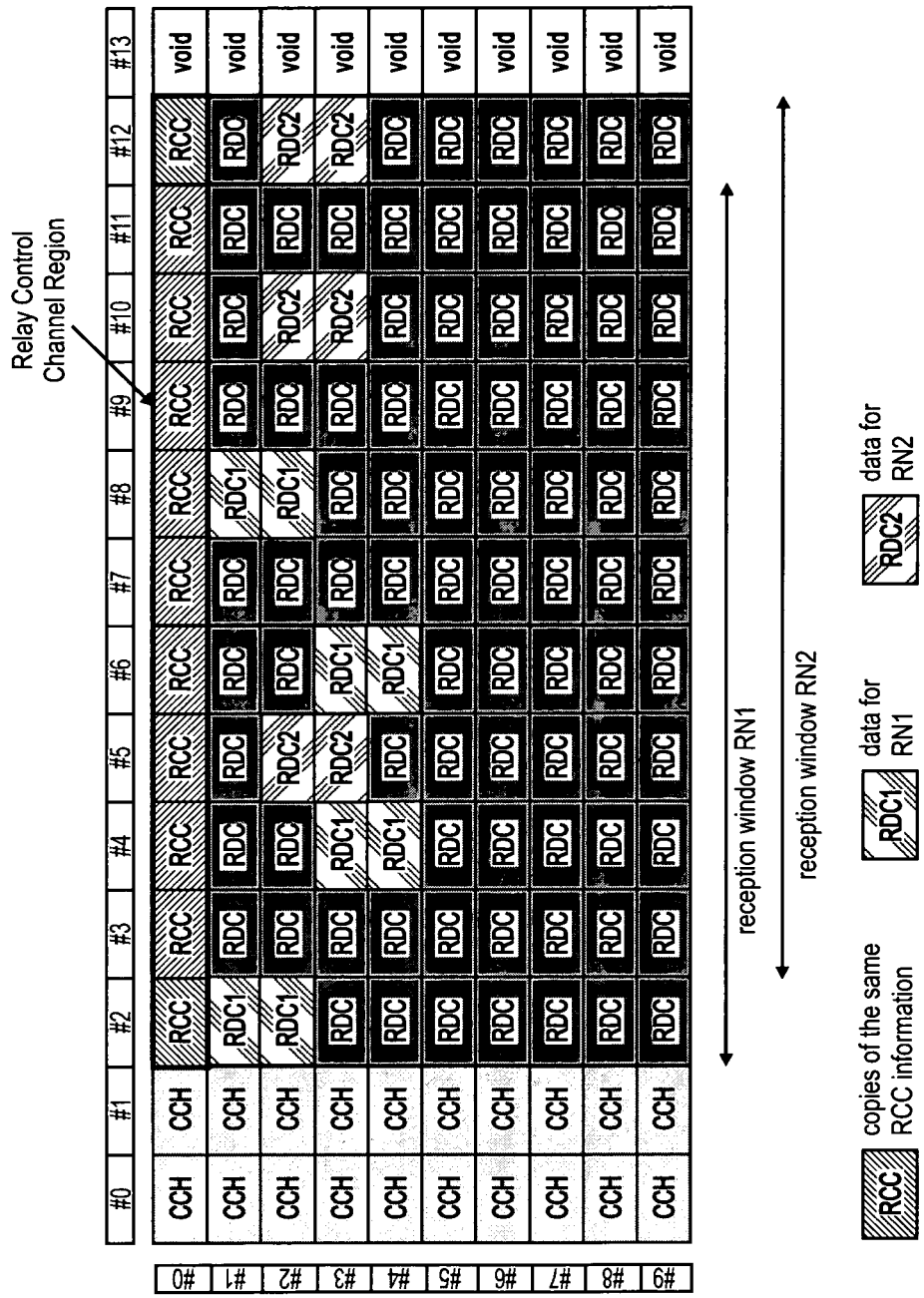

In FIG. 17, a further embodiment of the invention is shown where the Node B makes further use of the knowledge about the relay nodes' reception windows. If the Node B knows that RN1 can receive OFDM symbol #2 and that RN2 can receive OFDM symbol #12, it preferably puts parts of the data for RN1 (RDC1) on OFDM symbol #2, and parts of the data for RN2 (RDC2) on OFDM symbol #12. Further knowing that RN1 cannot receive OFDM symbol #12 and that RN2 cannot receive OFDM symbol #2, putting RDC1 content on OFDM symbol #12 and RDC2 content on OFDM symbol #2 will be avoided by the Node B.

While it has been mentioned in the previous exemplary embodiments of the invention that identical copies of (a part of the) relay control information is contained in the first and second control channel region for the relay nodes (e.g. in OFDM symbols #2 and #12), the relay control information does not have to be identical in the lowest detail. It is sufficient that the information in both regions can be equally used to reconstruct the identical information. For example looking at FIG. 10, it is possible that within the relay control channel region (RCC Region) two L1/L2 control channel messages for the relay nodes are transmitted. The detailed mapping within each relay control channel region (OFDM symbols #2 and #12 respectively in the example of FIG. 10) may be such that the L1/L2 control channel message is transmitted in the first part of the first relay control channel region (e.g. in OFDM symbol #2 at frequency resources #0 to #4) while the same message is transmitted in the second part of the second relay control channel region (e.g. in OFDM symbol #12 at frequency resources #5 to #9). Therefore a relay node that detects only the first relay control channel region (e.g. OFDM symbol #2) can detect in the first part of the first relay control channel region the first L1/L2 control channel message and in the second part of the first relay control channel region the second L1/L2 control channel message, while a relay node that detects only the second relay control channel region (e.g. OFDM symbol #12) can detect in the first part of the second relay control channel region the second L1/L2 control channel message and in the second part of the second relay control channel region the first L1/L2 control channel message.

In the context of LTE Rel. 8, where the relay control information may be DCI information that is mapped to CCEs, this means that the DCI information for relay nodes could be for example mapped onto a first set of CCEs in the first relay control channel region, but it is not mandatory that the same CCEs for this DCI is used in the second relay control channel region, even though the DCI information itself should be identical. In conjunction with the extension in FIG. 11 this means that it is only required that any DCI information transmitted in the first RCC region (symbols #2 and #3) is also present in the second RCC region (symbols #11 and #12), so the strict identity between #2 and #11 and between #3 and #12 on the OFDM symbol level is not mandatory.

Figure 19:
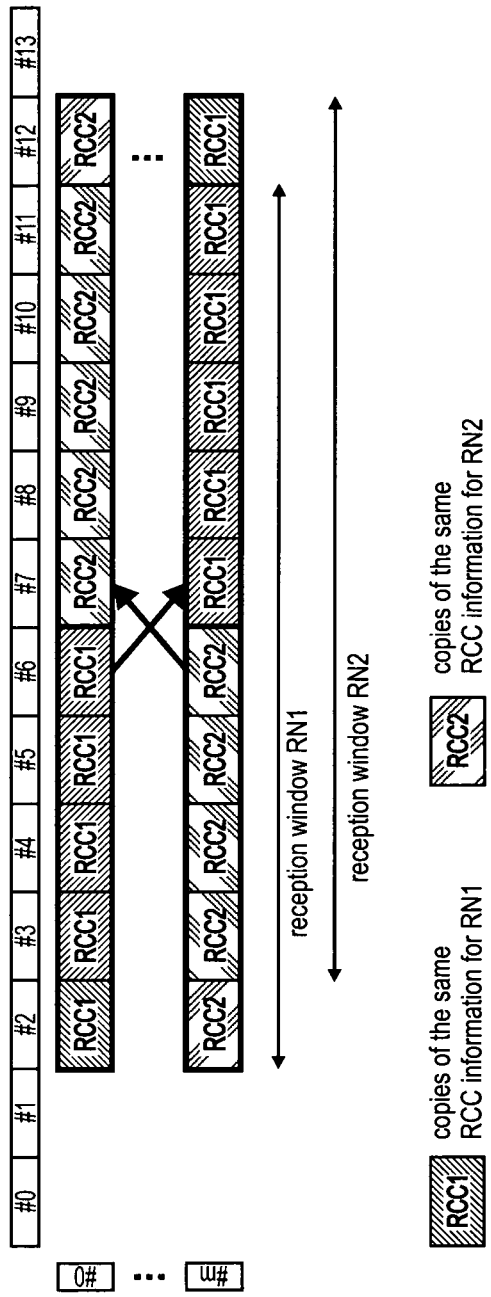

FIG. 19 shows another exemplary embodiment of a sub-frame. FIG. 19 is highlighting how the mapping of relay control information can be further varied to achieve frequency diversity for the control channel (the content apart from RCC is not shown for simplicity). Assuming that altogether two L1/L2 control channels need to be transmitted to RN1 and RN2 (designated by "RCC1" and "RCC2"), the mapping can be created such that the first part of the control information is mapped onto frequency resource #0, and the second part is mapped to frequency resource #m. The transition is shown by the respective arrows. Similar to the exemplary embodiments discussed above, the content of the RCC1 mapped on OFDM symbol #2 and #12 should be identical, and mutatis mutandis for RCC2.

Figure 18:
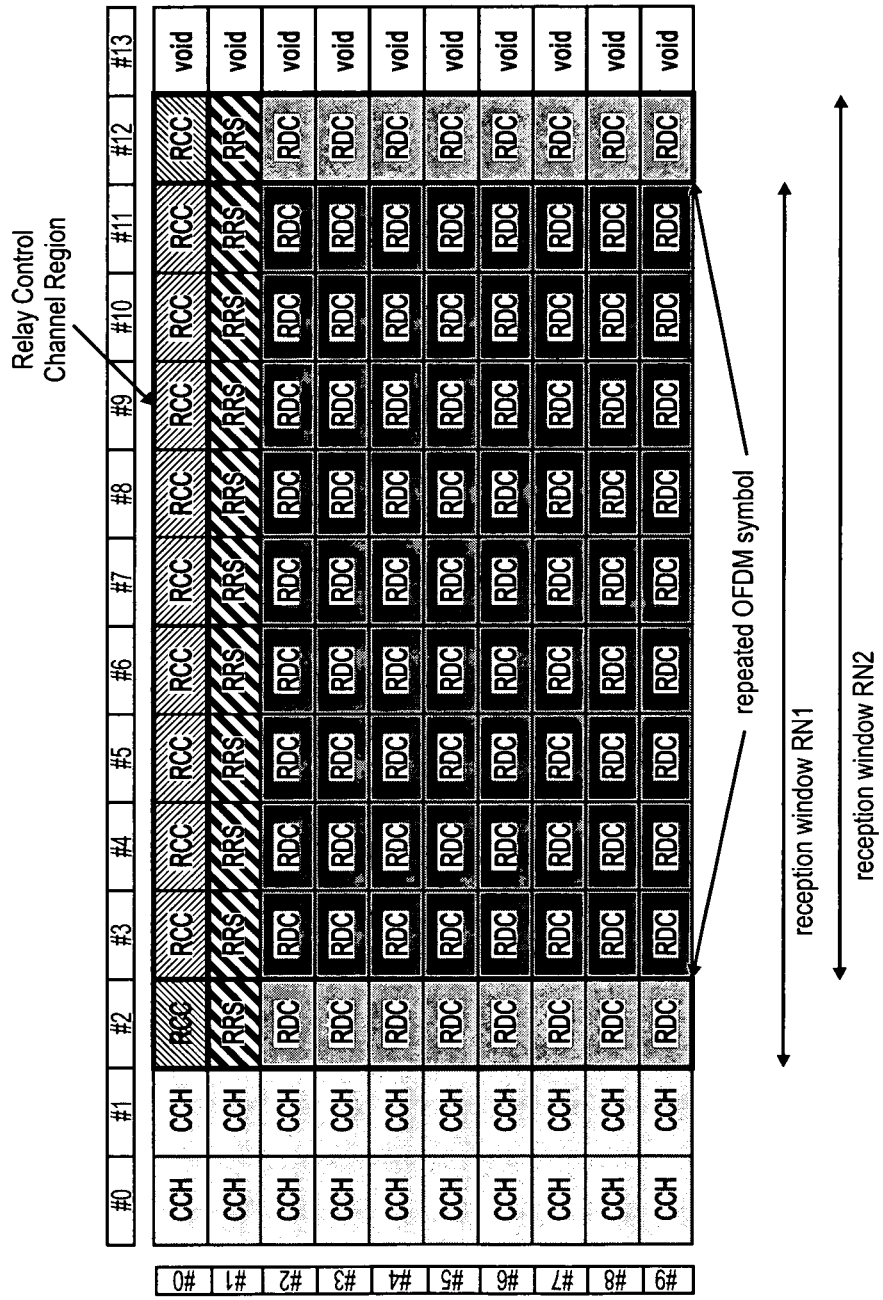

In another exemplary embodiment, the above outlined concepts for the RCC symbols can be applied also to the Relay Data Channel (RDC) or the Relay Reference Symbols (RRS) as exemplified in FIG. 18. Applying this concept to the RDC—i.e. the data for the relay nodes—this can further reduce the complexity of the scheduler since the scheduler does not need to be take into account reception windows of the individual receivers when performing the resource planning. For RRS, using the concepts outlined above for the mapping of the RCC to the OFDM symbols of the sub-frame can be used to improve the channel estimation accuracy or to improve the time and/or frequency synchronization of the receiver(s).

In one variant (not shown in FIG. 18), RRS could be included only on OFDM symbols where no other reference symbols are located, e.g. on OFDM symbols #2, #3, #5, #6, #8, #10, to avoid possible conflicts with the LTE Rel. 8 sub-frame structure. Such RRS may be common (i.e. to all RN) or dedicated (i.e. to a single RN including beamforming etc.) or both.

It should be also mentioned that FIG. 18 shows an FDM approach for multiplexing RCC; RDC and RRS to the OFDM symbols of the sub-frame. Those skilled in the art will perceive that the underlying principle is just that the content of the individual portions of these channels in OFDM symbol #2 should be identical to that in OFDM symbol #12.

In a further embodiment of the invention, the concepts outlined herein for the RCC symbols are applied to transmission of data to the relay node, i.e. the RDC. For example, the RDC data may also be (partly) repeated in the earliest and last OFDM symbol of the sub-frame which can be received by one of the relay nodes. The RDC data may be multiplexed with other information or data, such as relay control information (RCC), control information (CCH) for user equipments and/or data for user equipments, in a TDM fashion (i.e. data/information of one type is transmitted in one ODFM symbol) or in a FDM fashion (i.e. the data/information of one type is transmitted in a certain frequency range (i.e. subband(s) or subcarrier(s)) of the sub-frame's OFDM symbols) or in a TDM/FDM fashion (different types of data/information may be in the respective ODFM symbols of the sub-frame).

In one exemplary implementation, the RCC can be transmitted in OFDM symbol(s) of the sub-frame which are within different relay nodes' reception windows (i.e. no repetition of relay control information is necessary). For example, the RCC may be frequency multiplexed to a given frequency range of the OFDM symbols in the overlap of the different relay nodes' reception windows.

One part of the RDC may be transmitted in OFDM symbols of the sub-frame that are within the overlap of the different relay nodes' reception windows, while the remaining part of the RDC is transmitted in OFDM symbols of the sub-frame that are not within the overlap of the different relay nodes' reception windows.

Figure 23:
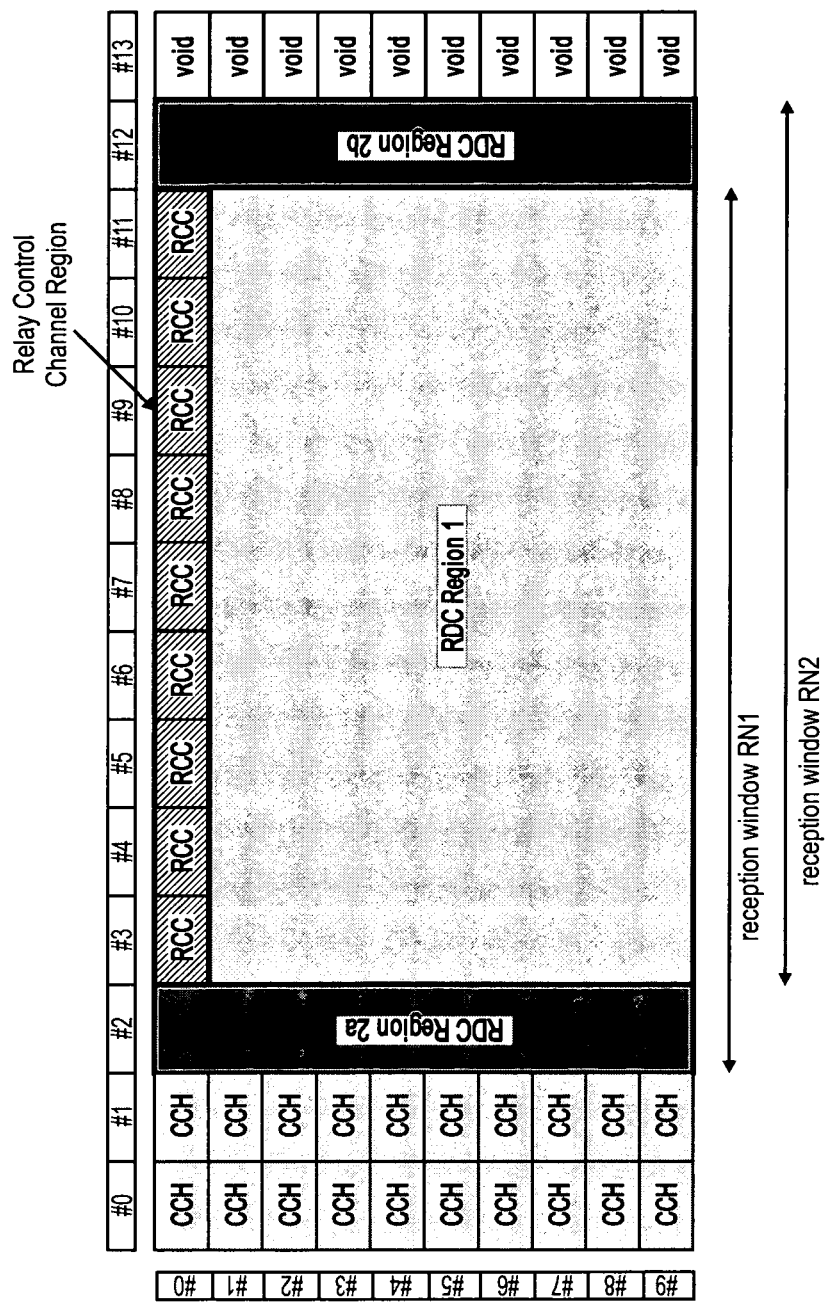

FIG. 23 shows an example of a sub-frame according to this embodiment, where the first two OFDM symbols (#0 and #1) are used completely for control channel (CCH) transmissions not directed towards relay nodes (e.g. directed to user equipments). The earliest OFDM symbol at least one of the relay nodes can receive is assumed to be OFDM symbol #2 (index j) while the last OFDM symbol at least one of the relay nodes can receive is OFDM symbol #12 (index k). The reception windows of the relay nodes RN1 and RN2 are therefore assumed to span either OFDM symbols #2 to #11 (i.e. j to k−1) or OFDM symbols #3 to #12 (i.e. j+1 to k).

Furthermore, a part (frequency index #0) of OFDM symbols #3 to #11 is used for transmission of RCC to relay nodes (RCC Region), where the start and end symbol are chosen such that the RCC region is the overlapping span of the reception windows of relay nodes RN1 and RN2, to thereby ensure that the RCC can be read from both relay nodes.

The RDC is divided into two major regions. RDC Region 1 includes (similar to the RCC region) the OFDM symbols which can be received by both relay nodes RN1 and RN2 in the time domain and the frequency indices #1 to #9 in the frequency domain. Data for relay node RN1 and/or RN2 can be transmitted within this region.

RDC Region 2a is formed by frequency domain resources within the OFDM symbol(s) of relay node RN1's reception window neither occupied by RDC Region 1, nor by the RCC Region, i.e. in this example frequency indices #1 to #9 of OFDM symbol #3. A further RDC Region 2b is formed by resources within the OFDM symbol(s) of relay node RN2's reception window neither occupied by RDC Region 1, nor by the RCC Region, i.e. in this example frequency indices #1 to #9 of OFDM symbol #12.

RDC data directed to relay node RN1 cannot be recovered by relay node RN1, if it is transmitted in RDC Region 2b (i.e. outside the reception window), and the same applies to RDC data directed to relay node RN2, if it is transmitted in RDC Region 2a. Hence, the Node B may ensure that RDC data directed to relay node RN1 is mapped and transmitted only within the OFDM symbols of relay node RN1's reception window (i.e. RDC Region 1 and RDC Region 2a), and that RDC data directed to relay node RN2 is transmitted only within the OFDM symbols of relay node RN2's reception window (i.e. RDC Region 1 and RDC Region 2b).

Alternatively, in another implementation, the transmitter ensures that the content of RDC Region 2a and RDC Region 2b is identical, i.e. the same RDC data (relay node RN1 and/or relay node RN2) is mapped to OFDM symbols #3 (#j) and #12 (#k). Then the transmitter does not need to know the respective reception window a-priori to transmission/scheduling, but can transmit the RDC data without caring whether the address relay node is able to receive OFDM symbol #3 (#j) or #12 (#k). In this implementation, the transmitter does therefore not need to know the timing relation between the relay nodes respectively their reception windows, but it is sufficient to know which OFDM symbols can be received by all relay nodes and which OFDM symbols of the sub-frame can only be received by a part of of the relay nodes. This knowledge may for example established by control signaling between nodes such as eNodeB and relay nodes, feedback signaling, network/site planning, and/or configuration.

In a further improved implementation, also reference signals (RRS) are to be mapped to individual resource elements of the sub-frame. The pattern for mapping the RRS may be for example pre-defined. If RRS signals are to be transmitted in one of the RDC Regions 2a or 2b, the same RRS signals may also be transmitted in the respective other RDC Region Region 2b or 2a, respectively.

Figure 24:
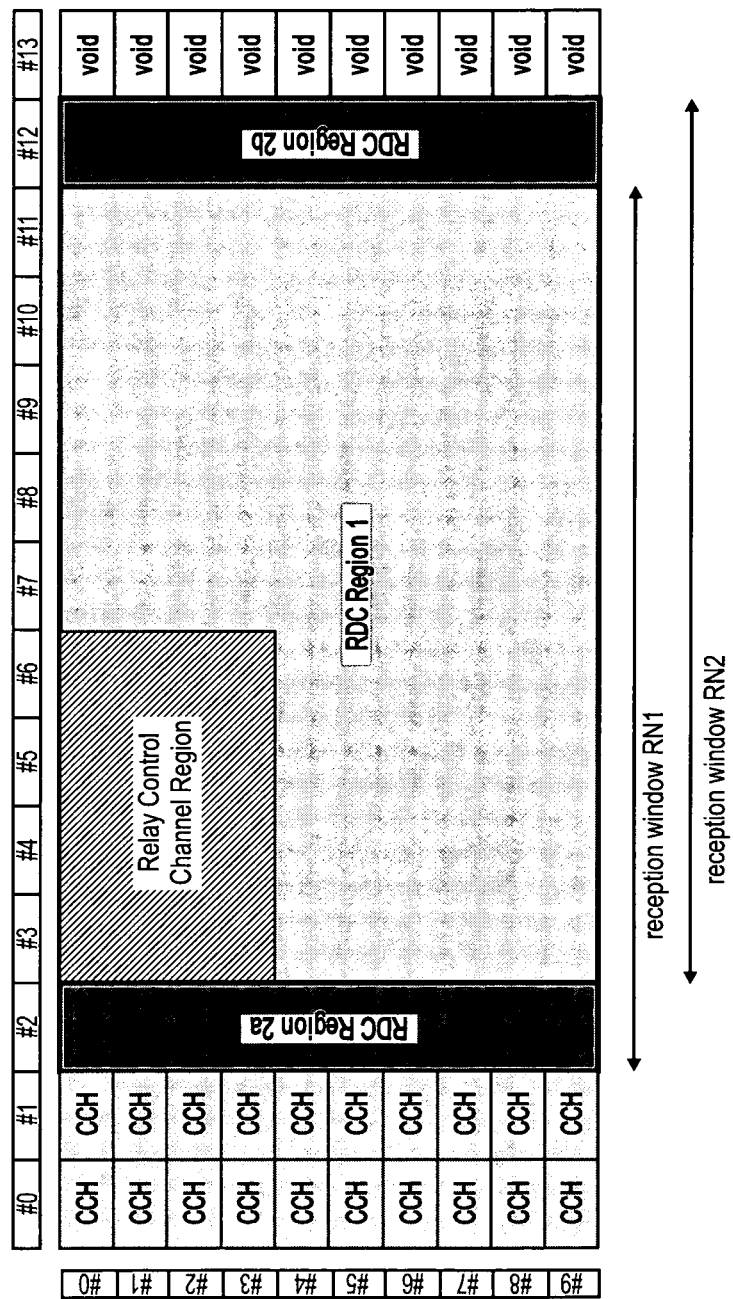

Furthermore, an alternative exemplary implementation according to another embodiment of the invention, the RCC Region may not necessarily be frequency multiplexed to a certain frequency range of the sub-frame, but may be mapped in the time domain to only a subset of the OFDM symbols of the sub-frame in the overlap region of the reception windows of the relay nodes, and in the frequency domain to a given certain frequency range. One exemplary structure of such sub-frame is shown in FIG. 24. All other resources of the sub-frame not used for RCC (or CCH or RRS) can be used for signaling data to the relay nodes (and/or user equipments) and define the RDC Region 1, respectively RDC Region 2a and 2b as shown in FIG. 23.

In a further exemplary embodiment, a Node B can further modify its transmitted signals for the control channel, if it has knowledge about at least some of the relay nodes' receiving windows. In this case, for relay control information directed towards a given relay node for which the Node B is aware of the reception window, the Node B does not have to transmit the same information outside the transmission window. For example, if the Node B knows that RN1 received OFDM symbol #2 but not #12, it is not required to transmit DCI information intended for RN1 in OFDM symbol #12. Instead, in such a case OFDM symbol #12 could exclusively contain relay control information intended to a RN for which the Node B knows that it is able to receive OFDM symbol #12, or it should contain (in addition to OFDM symbol #2) relay control information for RNs for which the Node B is not aware of the reception window. In any case, CCEs or generally resources in such OFDM symbols that are not required to be transmitted would preferably be punctured or nulled, i.e. no power is transmitted on those resources.

Figure 20:
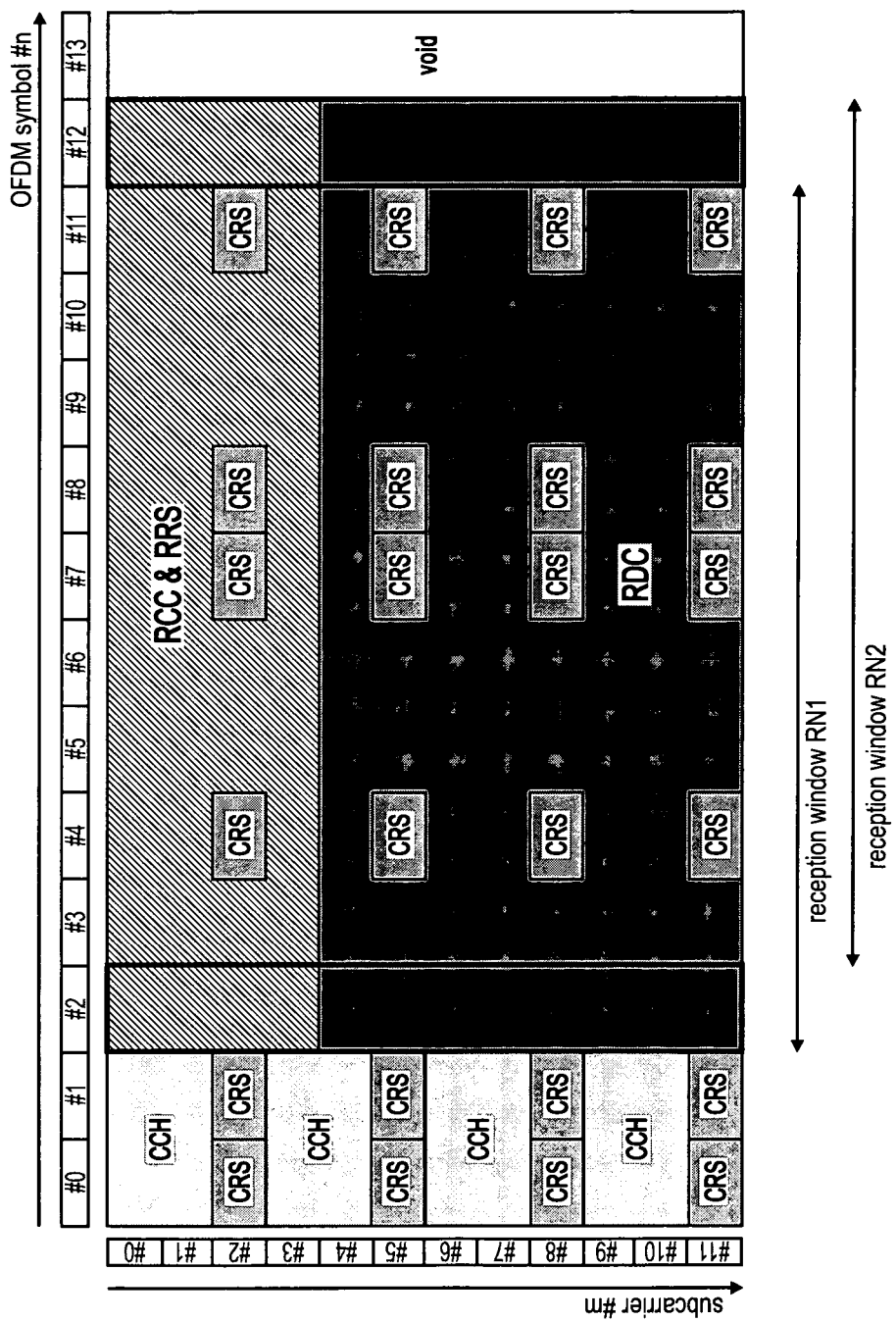
FIG. 20 shows another exemplary sub-frame for an advanced 3GPP LTE system according to another embodiment of the invention for transmission by a Node B to the relay nodes assuming the variable propagation delay of transmission signals and switching of the relay nodes' operation mode as shown in FIG. 6, FIG. 21 exemplary illustrates the reception of a sub-frame from a Node B at different relay nodes and the transmission windows and reception windows of the relay nodes, taking into account the variable propagation delay of transmission signals between the Node B (eNB) and relay nodes (RN1 and RN2) and a switching between transmission mode and reception mode within the sub-frame at the relay nodes, whereby the transmission timing of downlink sub-frames is not synchronized between Node B and relay nodes.

FIG. 20 shows an example of a sub-frame according to a further exemplary embodiment of the invention. FIG. 20 illustrates how a sub-frame structure transmitted by an Node B could look like, if introduced into the LTE context. Considering for exemplary purposes only a single Physical Resource Block (PRB) of a sub-frame, there are 12 subcarriers (labeled #0 to #11 on the vertical axis) and 12 or 14 OFDM symbols (only the latter exemplary shown here, labeled #0 to #13 on the horizontal axis)—see 3GPP TS 36.211, section 6.2.

OFDM symbols #0 and #1 carry the CCH region where DCI (L1/L2 control channel(s) or PDCCH(s)) for user equipments connected to the Node B are contained. OFDM symbol #2 to #12 carry information directed towards relay nodes. In those symbols, subcarriers #0 to #3 carry the DCI (relay control information) in CCEs of the RCC as well as (optionally) reference symbols (RRS), while subcarriers #4 to #11 carry the SDCH data directed to relay nodes in the RDC region. Assuming a four transmit antenna layout according to LTE, the whole sub-frame structure contains interspersed common reference symbols (CRS), which cannot be used for any other purpose (even within the RCC/RRS/RDC region). The RCC/RRS/RDC content of OFDM symbol #2 is repeated in OFDM symbol #12.

Parameters that determine the RCC&RRS transmission can be included into the Relay Control Region similar as Physical Control Format Indicator CHannel (PCFICH) in LTE Rel. 8 (see 3GPP TS 36.211, section 6.7). For example, an indicator can be included into a configured or determined part of the relay control region that all relay nodes can detect. Such an indicator can contain one or more of the following information:

The resource(s) where (additional) information is located, e.g. OFDM symbol number, frequency resource, employed code
The number of time/frequency/code resources
The employed MIMO strategy
The transmitted power
Which resources are used for what purpose, such as DCI, RRS, ACK/NACK Retransmission protocol feedback in form of ACK/NACK for uplink traffic provided from a relay node to a Node B may also be included into the Relay Control Channel Region (RCC) similar as Physical Hybrid ARQ Indicator CHannel (PHICH) in LTE Rel. 8 (see 3GPP TS 36.211, section 6.9). A configured or determined part of the Relay Control Channel (RCC) Region could be used to carry feedback to the relay node whether a previous relay node-to-Node B transmission is acknowledged (ACK) or not (NACK). This is particularly applicable for ARQ or HARQ mechanisms in the relay node-to-Node B communication.

Further details about the transmission downlink structure in LTE Rel. 8 can be found e.g. in 3GPP TS 36.211, section 6.

In the embodiments of the invention discussed above, it has been assumed for exemplary purposes that the transmission timing of Node B and relay nodes has been synchronized, i.e. the Node B and the relay nodes simultaneously transmit the OFDM symbols #0 and #1. However, the principles outlined herein may also be applied to situations, where the transmission timing of Node B and the relay nodes is not synchronized. Accordingly, for downlink transmissions the point in time where a sub-frame starts (i.e. when OFDM symbol #0 of the sub-frame is transmitted) may be different between Node B and relay nodes.

Figure 21:
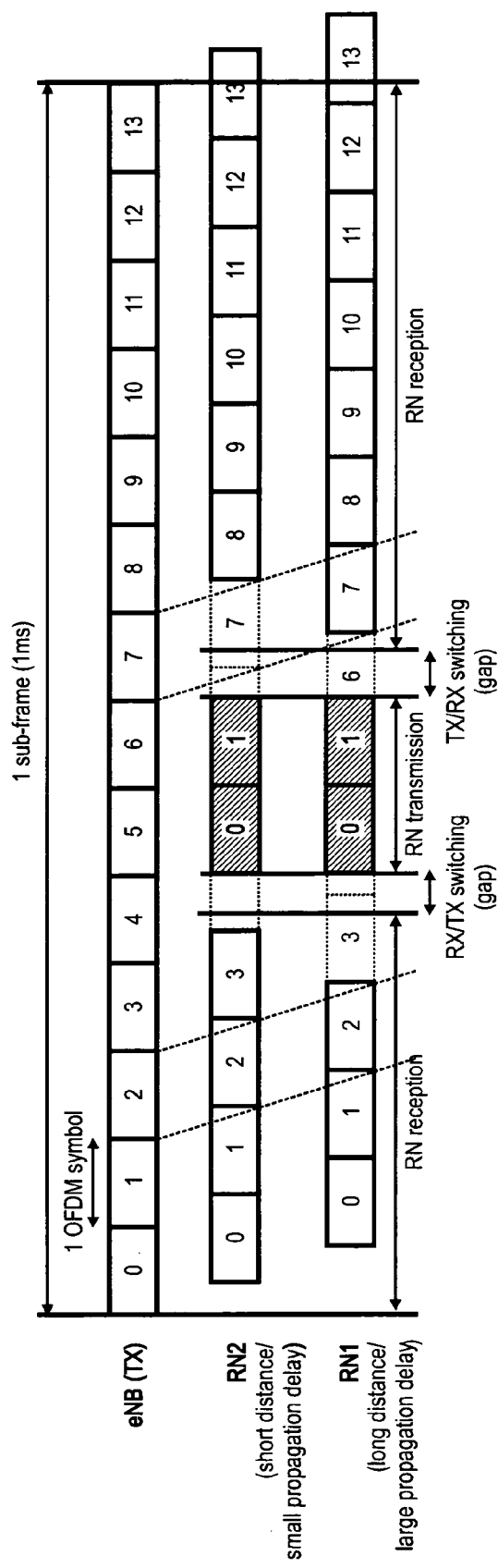

Such an exemplary situation is shown in FIG. 21. As can be perceived from FIG. 21, the transmission timing of the relay nodes is different from the Node B. In FIG. 21 it is assumed that the relay nodes start receiving several OFDM symbols from the Node B (only one sub-frame is shown for simplicity) and switch to a transmission mode during reception of the sub-frame to transmit OFDM symbols #0 and #1 containing control information from the relay node to the user equipments connected to the respective relay node. After transmission of the symbols #0 and #1, the relay nodes switch back to a reception mode for receiving the remaining sub-frame transmitted by the Node B. Please note that due to the different transmission timing for downlink sub-frames, the relay nodes may receive also symbol #13 although from the reception timing perspective the symbol extends in the next Node B's transmitted sub-frame timing.

Due to the transmission timing difference of relay nodes and Node B, the entire "gap" in the reception of a sub-frame transmitted by the Node B is defined by the switching time required for the switching from transmission (TX) mode to reception (RX) mode and vice versa, as well as the two symbol periods for transmitting OFDM symbols #0 and #1 by the relay nodes. Hence, the reception window of the sub-frame transmitted by the Node B at RN1 is formed by complete OFDM symbols #0 to #2 and #7 to #13, while the reception window of the sub-frame transmitted by the Node B at RN2 is formed by complete OFDM symbols #0 to #3 and #8 to #13.

Figure 22:
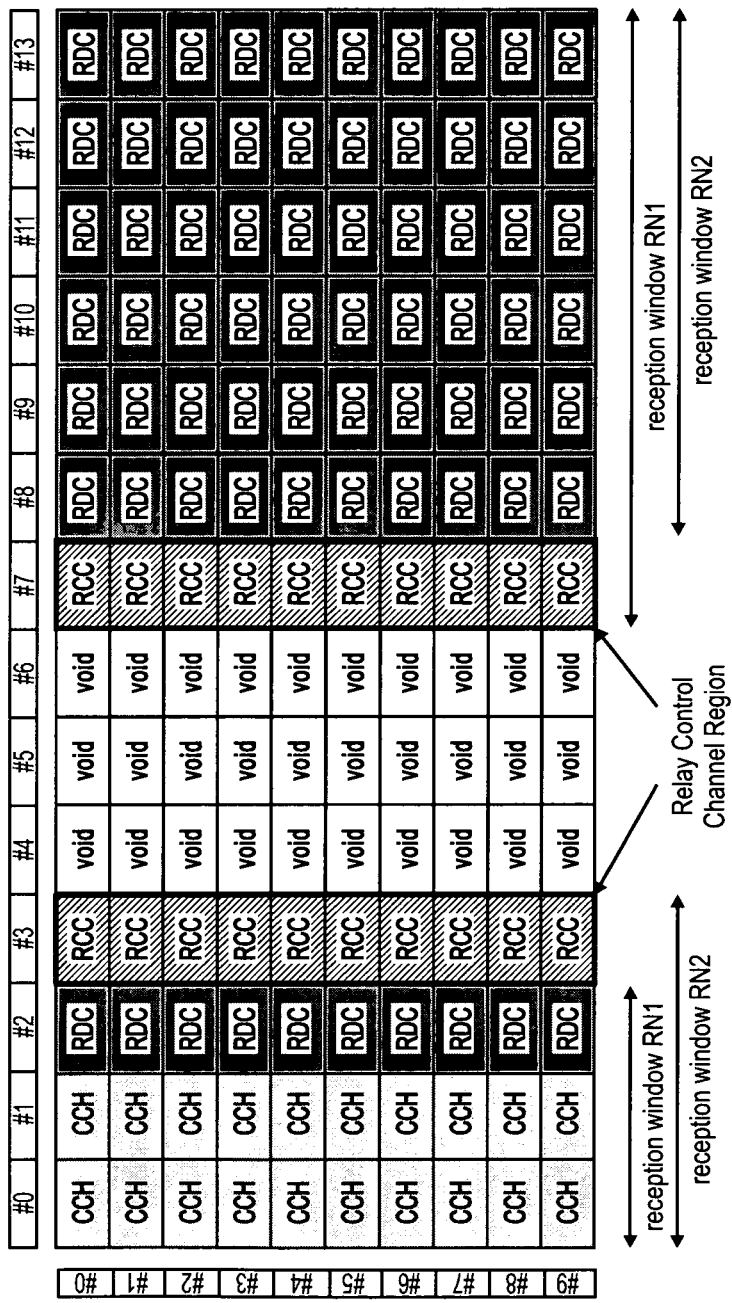
FIG. 22 shows an exemplary sub-frame according to another embodiment of the invention for transmission by a Node B to the relay nodes assuming the variable propagation delay of transmission signals and switching of the relay nodes' operation mode as shown in FIG. 21, and FIGS. 23 & 24 show further different exemplary sub-frame according to different embodiments of the invention for transmission by a Node B to the relay nodes assuming the variable propagation delay of transmission signals and switching of the relay nodes' operation mode as shown in FIG. 6.

Accordingly, if the Node B is aware of the timing differences in the sub-frame synchronization in the downlink, an exemplary sub-frame for use in a scenario where transmission timing of sub-frame is not synchronized between Node B and relay nodes is exemplary depicted in FIG. 22. As can be seen in FIG. 21, symbols #4, #5 and #6 cannot be received by either RN1 and RN2, so that they should not contain any information for the relay nodes (indicated by "void"). These resources—as well as all other resources labeled "void" in the accompanying figures—may nevertheless carry information for the other receivers such as user equipments connected to the Node B directly, i.e. not through a relay node.

OFDM symbols #3 and #7 of the sub-frame transmitted by the Node B can be received either by RN1 (symbol #7) or by RN2 (symbol #3). In accordance with the principles outlined above, if using a TDM approach for multiplexing the control information for the relay node to the sub-frame, the relay control information for the relay nodes should be included to these two symbols. Accordingly, OFDM symbols #3 and #7 should each contain identical relay control information for the relay nodes (RN1 and RN2).

If the Node B should be aware of the reception windows of either one or both of RN1 and RN2, it may of course send the relay control information for a relay node in either OFDM symbol #3 or #7 (depending on which symbol can be received by the respective relay node). Similarly, as in the examples discussed above using an FDM approach for multiplexing the relay control information to the sub-frame, the Node B may also map information for a respective relay node to either #3 or #7, if the Node B knows which of the two symbols can be received by a respective relay node.

In the foregoing, mainly different exemplary structures for a sub-frame transmitted by a Node B to one or more relay nodes have been discussed. Another aspect of the invention is related to (the operation of) the Node B and the relay nodes, especially with respect to the generation, transmission and reception of sub-frames and contained information in accordance with this invention.

As discussed in the Technical Background section above, a Node B may be generally considered to comprise a scheduling entity (typically implemented by a software implementing a scheduling algorithm and being executed by some processor of the Node B). The Node B schedules the user equipments and relay nodes according to a scheduling algorithm to decide on the (user/relay) data to be transmitted within a same or subsequent sub-frame, be it an uplink or downlink transmission. The Node B may do a scheduling decision on a per-sub-frame basis.

Once the Node B has decided which user equipments and relay nodes should be allocated radio resources in a sub-frame in which data (e.g. transport blocks, data of radio bearers or logical channels in the LTE context) should be transmitted, the Node B is generating the OFDM symbols forming the sub-frame. Essentially the sub-frame generated by the Node B may have a structure as outlined in any of the exemplary embodiments described herein.

In the generation of the OFDM symbols of the sub-frame, the Node B will obey certain rules so as to arrive at the desired sub-frame structure when mapping the data of the scheduled network nodes to the radio resources (OFDM symbols) of the sub-frame. According to one exemplary embodiment of the invention, the Node B ensures that:

identical relay control information for the relay nodes scheduled is transmitted within at least two OFDM symbols (j and k) out of the OFDM symbols of the sub-frame, relay control information and data destined to a relay node is mapped on OFDM symbols of the sub-frame that can be received by the respective relay node.

control information related to data destined to user equipments communicating with the Node B via a direct air interface is mapped to the first m OFDM symbols of a sub-frame, and data destined to user equipments is mapped on OFDM symbols of a sub-frame other than the first m OFDM symbols.

Generally, it may be assumed that a relay node should be transmitting in each sub-frame synchronization symbols irrespective of whether it is to receive a sub-frame from the Node B in the given sub-frame time period. According, the relay node will have to switch between a transmission mode and a reception mode within the duration of a sub-frame received from the Node B as previously outlined herein. While in the transmission mode, the relay node transmits within a first subset of OFDM symbols of a downlink sub-frame (e.g. OFDM symbols #0 and #1) the control information (comprising the synchronization symbols) for its user equipments connected via a direct air interface. In the receiving mode the relay node receives a second subset of OFDM symbols within the sub-frame (e.g. symbols #2 to #11 or symbols #3 to #12) from a Node B. The second subset of OFDM symbols comprises at least one of two OFDM symbols that may contain identical relay control information for the relay node—as outlined above, if the reception window of the relay node is known to the Node B, the Node B could also include the relay control information for the relay node in an appropriate OFDM symbol within the relay node's reception window. Once having received the OFDM symbols in its reception window, the relay node is extracting the relay control information therefrom and uses the extracted relay control information to demodulate and in case that a downlink transmission is indicated in the control information decode the respective data transmitted from the Node B to the relay node; in case that an uplink transmission is indicated in the control information, the relay node prepares for transmission to the Node B according to the detected control information and/or established procedures of the communication system. The relay control information may for example indicate the resource assignment (i.e. identify the subcarrier on which data for the relay node has been mapped) and the modulation and coding scheme for the data.

Another embodiment of the invention relates to the implementation of the above described various embodiments using hardware and software. It is recognized that the various embodiments of the invention may be implemented or performed using computing devices (processors) that are suitably controlled by executable instructions that cause the computing device to perform the functions according to the different embodiments of the invention described herein. For example the scheduling function and the sub-frame generation including the mapping of transmission data to appropriate OFDM symbols in the sub-frame according to given mapping rules may be for example implemented in hardware and/or software. Similarly, the control of the relay node regarding the switching between transmission mode and reception mode within a sub-frames, the appropriate ordering and interpretation of the OFDM symbol contents, etc. may also be implemented in hardware and/or software. A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer-readable storage media, for example RAM, EPROM, EEPROM, flash memory, registers, hard disks, CD-ROM, DVD, etc.

Most of the embodiments have been outlined in relation to a 3GPP-based architecture of a communication system and the terminology used in the previous sections mainly relates to the 3GPP terminology. However, the terminology and the description of the various embodiments with respect to 3GPP-based architectures are not intended to limit the principles and ideas of the inventions to such systems only.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the concepts and sub-frame structures proposed herein may be readily applied in the architectures described in the Technical Background section. Furthermore, the concept of the invention may be also readily used in the LTE-A RAN currently discussed by the 3GPP.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

The invention claimed is:

1. A method for operating a relay node in a communication system within a temporal duration of a sub-frame, the sub-frame being divided into a plural OFDM symbols, the method comprising:
switching between a transmission mode and a reception mode within said duration of the sub-frame,
in said transmission mode, transmitting within a first subset of Orthogonal Frequency Division Multiplexing (OFDM) symbols within the sub-frame control information for receivers connected to the relay node via a direct air interface,
in said receiving mode, receiving by the relay node a second subset of OFDM symbols within the sub-frame from a Node B, wherein said second subset of OFDM symbols comprises at least one of two OFDM symbols (j and k) containing identical relay control information and/or identical data for the relay node.

2. The method according to claim 1, further comprising the step of extracting the relay control information and/or data for the relay node from OFDM symbol j and/or k, and using the extracted relay control information to decode/extract the data transmitted from the Node B to the relay node within said second subset of OFDM symbols.

3. The method according to claim 1, wherein the second subset of OFDM symbols is either OFDM symbols j to k−1 or OFDM symbols j+1 to k, and the method is further comprising the steps of extracting the relay control information from OFDM symbols j to k−1 or OFDM symbols j+1 to k of said sub-frame, and using the extracted relay control information to decode/extract the data transmitted to the relay node by the Node B.

4. The method according to claim 1, wherein the transmission timing of sub-frames is synchronized between the Node B and the relay node or wherein the Node B is aware of the time shift in the transmission timing of sub-frames sent by Node B and relay node.

5. A relay node for transmitting and receiving data in a communication system within a sub-frame, wherein the sub-frame is divided into an plural Orthogonal Frequency Division Multiplexing (OFDM) symbols, the relay node comprising:
a processing unit for switching between a transmission mode and a reception mode within said duration of the sub-frame,
a transmitter for transmitting in said transmission mode and within a first subset of OFDM symbols within the sub-frame control information and/or data for receivers connected to the relay node via a direct air interface, and
a receiver for receiving in said receiving mode a second subset of OFDM symbols within the sub-frame from a Node B, wherein said second subset of OFDM symbols comprises at least one of two OFDM symbols (j and k) containing identical relay control information and/or identical data for the relay node.

6. The relay node according to claim 5, wherein the second subset of OFDM symbols that can be received by the relay node depends on the signal propagation delay experienced in transmitting the individual OFDM symbols from the Node B to the relay node and the switching of the relay node between transmission mode and reception mode within the period of time in which the sub-frame is transmitted by a Node B.

7. The relay node according to claim 6, wherein the second subset of OFDM symbols that can be received by the relay node are OFDM symbols j (j>1) to k (k<n), and the OFDM symbols j and k convey copies of a portion of said relay control information for the relay node, while the remaining portion of said relay control information and/or data for the relay node is modulated to at least one other OFDM symbol of said subset of OFDM symbols j to k.

8. The relay node according to claim 7, wherein each OFDM symbol consists of plural modulation symbols modulated on different subcarrier of the available bandwidth, and wherein the relay control information for the relay node is mapped to plural modulation symbols within the OFDM symbols j to k.

* * * * *